(12) United States Patent
Tsuboi et al.

(10) Patent No.: US 10,999,515 B2
(45) Date of Patent: May 4, 2021

(54) IMAGING DEVICE, CONTROL METHOD, AND PROGRAM

(71) Applicant: Sony Corporation, Tokyo (JP)

(72) Inventors: Yoshimi Tsuboi, Tokyo (JP); Tadashi Yamaguchi, Saitama (JP); Haruka Asai, Tokyo (JP)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 16/301,101

(22) PCT Filed: May 1, 2017

(86) PCT No.: PCT/JP2017/017138
§ 371 (c)(1),
(2) Date: Nov. 13, 2018

(87) PCT Pub. No.: WO2018/003281
PCT Pub. Date: Jan. 4, 2018

(65) Prior Publication Data
US 2019/0191102 A1 Jun. 20, 2019

(30) Foreign Application Priority Data

Jun. 29, 2016 (JP) .............................. JP2016-128830

(51) Int. Cl.
*H04N 5/232* (2006.01)
*G03B 17/14* (2021.01)
(Continued)

(52) U.S. Cl.
CPC ....... *H04N 5/232941* (2018.08); *G03B 17/14* (2013.01); *G03B 17/20* (2013.01);
(Continued)

(58) Field of Classification Search
CPC ......... H04N 5/232941; H04N 5/23209; H04N 5/23216; H04N 5/232933; H04N 5/23245;
(Continued)

(56) References Cited

U.S. PATENT DOCUMENTS 8,508,655 B2    8/2013  Suto
2003/0048374 A1*  3/2003  Minakuti ............... H04N 1/603
                                                       348/360
(Continued)

FOREIGN PATENT DOCUMENTS

CN       1637456 A      7/2005
CN     102761689 A     10/2012
(Continued)

OTHER PUBLICATIONS

Extended European Search Report dated Apr. 15, 2019 for corresponding European Application No. 17819648.1.
(Continued)

*Primary Examiner* — Nhan T Tran
(74) *Attorney, Agent, or Firm* — Michael Best & Friedrich LLP

(57) ABSTRACT

A status change estimating unit 501 estimates a change in lens status of an interchangeable lens 21. A warning control unit 502 determines whether user setting lens status set by a user for the interchangeable lens 21 through a user interface unit 41 or a communication unit 43 and interchangeable lens status are the same. In a case where the warning control unit 502 determines that the user setting lens status and the interchangeable lens status are different from each other, the warning control unit 502 outputs warning information to a warning unit 42 to warn the user. This configuration enables the user to recognize a difference between the user setting
(Continued)

lens status and the interchangeable lens status by the warning issued by the warning unit 42.

24 Claims, 12 Drawing Sheets

(51) Int. Cl.
*G03B 17/20* (2021.01)
*H04N 5/235* (2006.01)
(52) U.S. Cl.
CPC ..... *H04N 5/23209* (2013.01); *H04N 5/23216* (2013.01); *H04N 5/232933* (2018.08); *G03B 2206/00* (2013.01); *H04N 5/2351* (2013.01); *H04N 5/23212* (2013.01); *H04N 5/23245* (2013.01); *H04N 5/23248* (2013.01); *H04N 5/23296* (2013.01)
(58) Field of Classification Search
CPC ............. H04N 5/2351; H04N 5/23296; H04N 5/23248; H04N 5/23212; G03B 17/20; G03B 17/14; G03B 2206/00
See application file for complete search history.

(56) References Cited

U.S. PATENT DOCUMENTS

2005/0128342 A1* 6/2005 Izukawa ............ H04N 5/23209
348/360
2007/0116375 A1 5/2007 Utsugi et al.
2009/0028390 A1 1/2009 Hayaishi

FOREIGN PATENT DOCUMENTS

| | | |
|---|---|---|
| EP | 1542455 A2 | 6/2005 |
| EP | 2891921 A1 | 7/2015 |
| JP | 2005176147 A | 6/2005 |
| JP | 2006-180404 A | 7/2006 |
| JP | 2006180404 A | 7/2006 |
| JP | 2009-031870 A | 2/2009 |
| JP | 2009-302697 A | 12/2009 |
| JP | 2011-002848 A | 1/2011 |
| JP | 2011002748 A | 1/2011 |
| JP | 2011002848 A | 1/2011 |
| JP | 2014-036262 A | 2/2014 |
| JP | 104950556 A | 9/2015 |
| WO | 2013/042736 A1 | 3/2013 |
| WO | 2013/183333 A1 | 12/2013 |

OTHER PUBLICATIONS

Chinese Office Action dated May 28, 2020 for corresponding Chinese Application No. 201780038204.6.
Japanese Office Action dated Aug. 25, 2020 for corresponding Japanese Application No. 2018-524924.

* cited by examiner

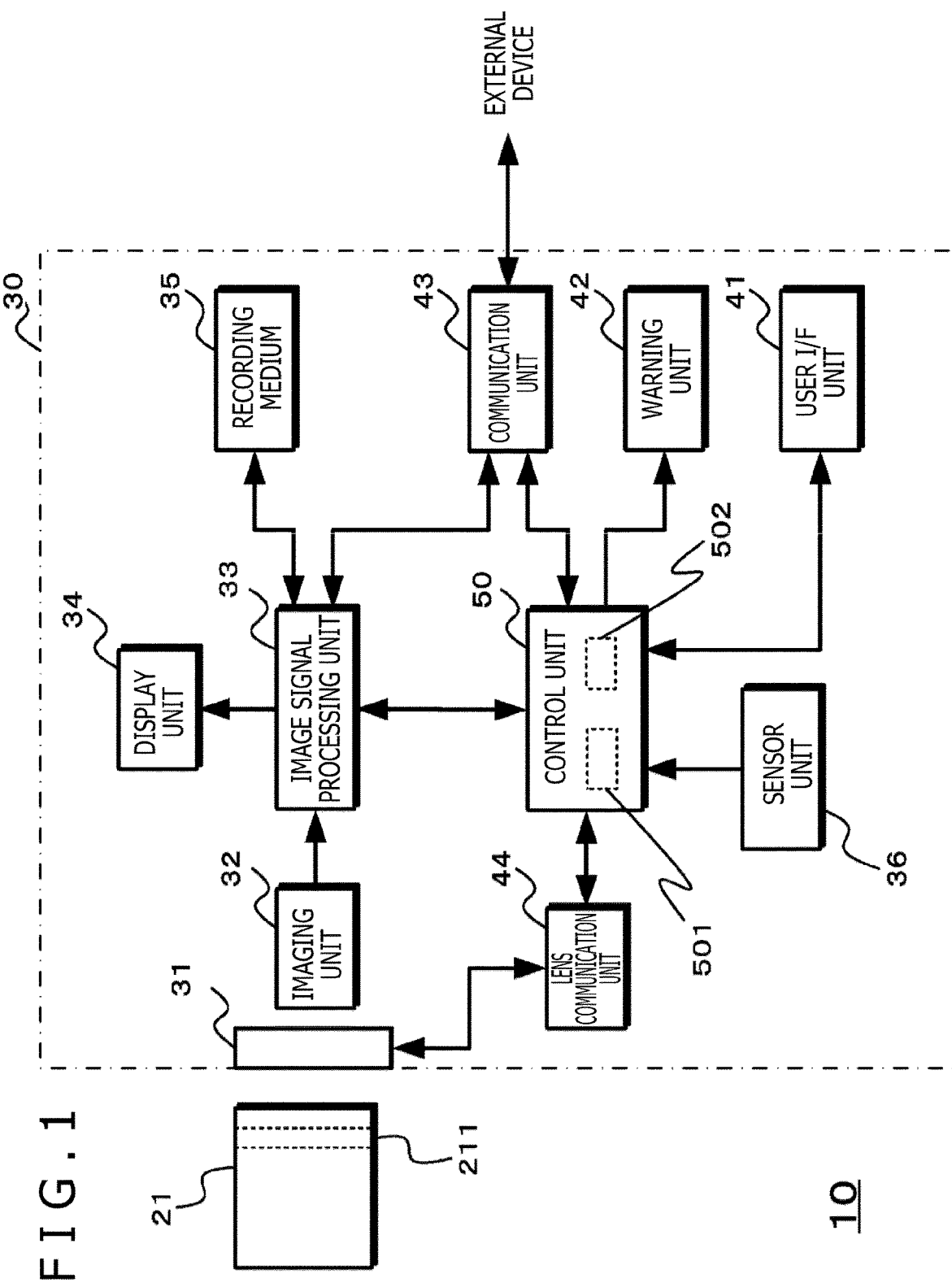

FIG. 2

| TARGET OPERATIONS | CHANGE FACTORS | ESTIMATION RESULTS (DETERMINATION CONDITIONS TO DETERMINE WHETHER LENS STATUS HAS BEEN CHANGED) |
|---|---|---|
| USER OPERATIONS ON INTERCHANGEABLE LENS | USER HAS ADJUSTED INTERCHANGEABLE LENS | ESTIMATED F-STOP HAS BEEN CHANGED |
| | | ESTIMATED FOCAL LENGTH HAS BEEN CHANGED |
| | | ESTIMATED SUBJECT DISTANCE HAS BEEN CHANGED |
| | | TIME ELAPSED SINCE PREVIOUS IMAGING (IMAGING TIME INTERVAL > TH1) |
| | | TIME ELAPSED SINCE PREVIOUS IMAGING (IMAGING TIME INTERVAL > TH2) |
| | INTERCHANGEABLE LENS HAS BEEN CHANGED TO DIFFERENT INTERCHANGEABLE LENS | ESTIMATED LATERAL CHROMATIC ABERRATION HAS BEEN CHANGED |
| | | ATTACHMENT/DETACHMENT OF LENS HAS BEEN DETECTED |
| | | TIME ELAPSED SINCE PREVIOUS IMAGING (IMAGING TIME INTERVAL > TH3) |
| USER OPERATIONS ON IMAGING DEVICE | IMAGE STABILIZATION SETTING HAS BEEN CHANGED | SETTING HAS BEEN CHANGED |
| | LENS NAME HAS BEEN NEWLY INPUT/MODIFIED | NEWLY INPUT/MODIFIED |
| | POWER HAS BEEN TURNED ON BY USER | POWER HAS BEEN TURNED ON |

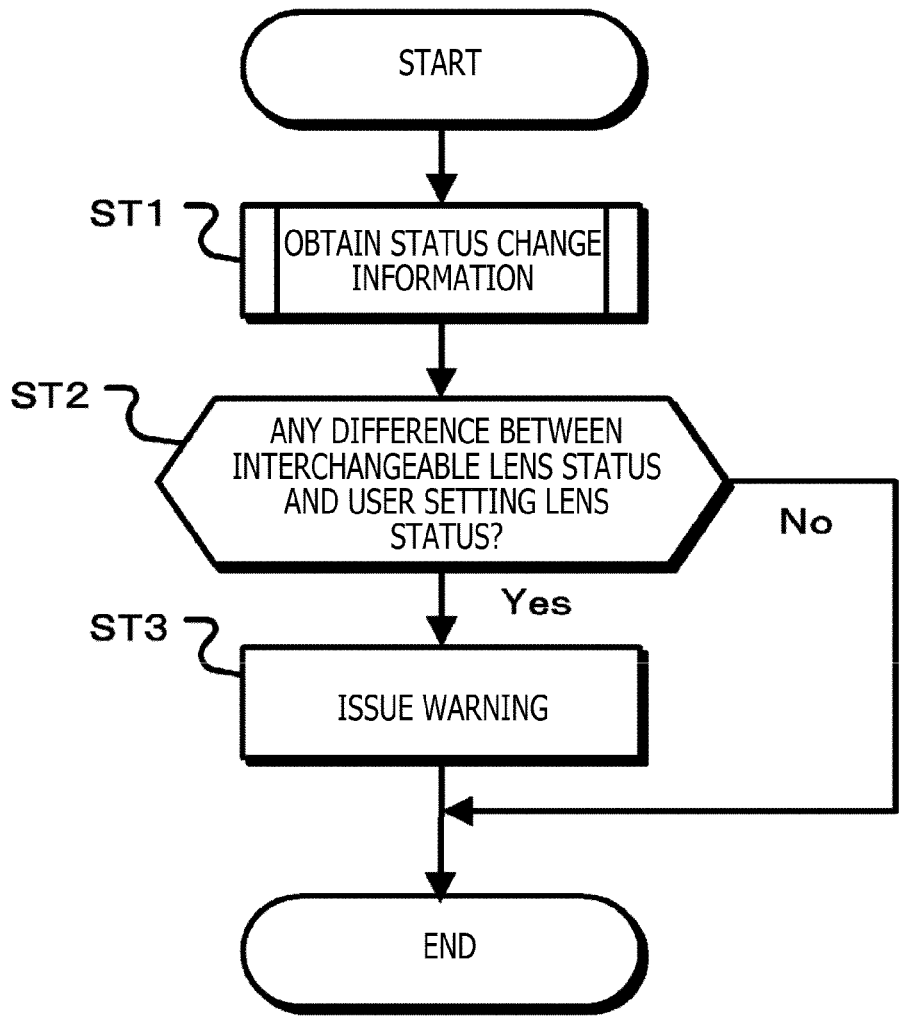

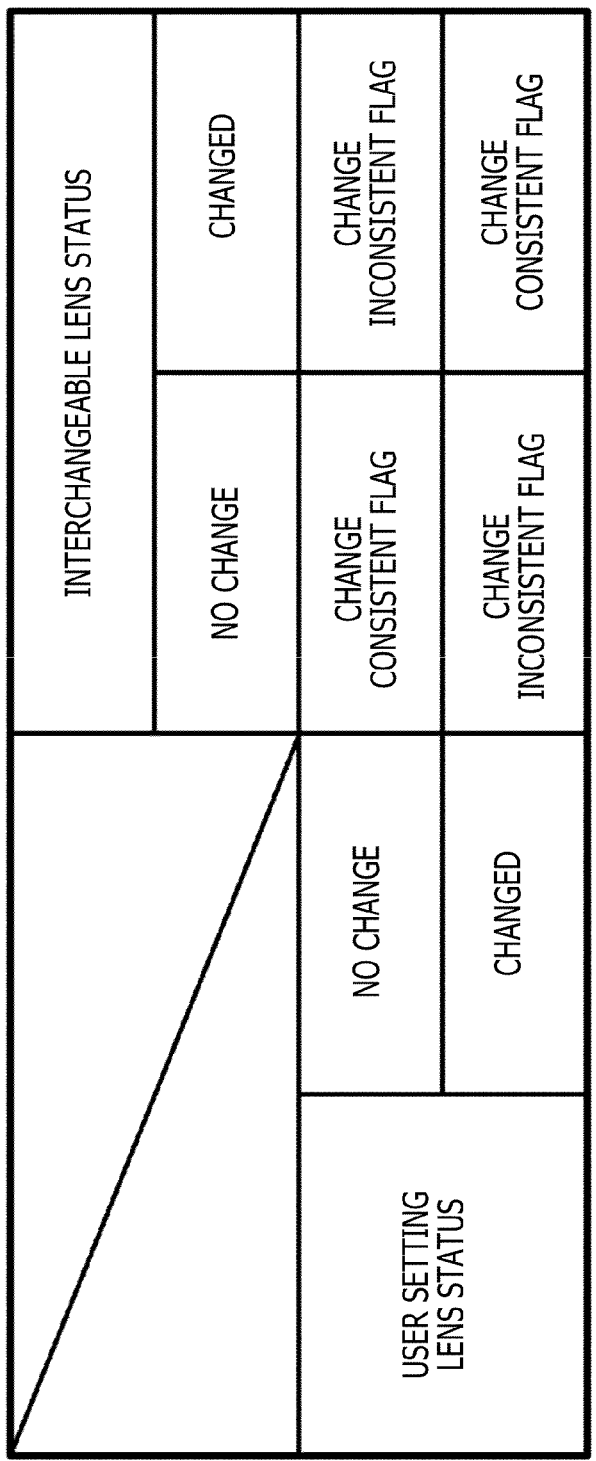

FIG. 8

| USER SETTING LENS STATUS | INTERCHANGEABLE LENS STATUS | | |
|---|---|---|---|
| | CHANGED IN NEGATIVE DIRECTION | NO CHANGE | CHANGED IN POSITIVE DIRECTION |
| CHANGED IN NEGATIVE DIRECTION | CHANGE-DIRECTION CONSISTENT FLAG | CHANGE-DIRECTION INCONSISTENT FLAG | CHANGE-DIRECTION INCONSISTENT FLAG |
| NO CHANGE | CHANGE-DIRECTION INCONSISTENT FLAG | CHANGE-DIRECTION CONSISTENT FLAG | CHANGE-DIRECTION INCONSISTENT FLAG |
| CHANGED IN POSITIVE DIRECTION | CHANGE-DIRECTION INCONSISTENT FLAG | CHANGE-DIRECTION INCONSISTENT FLAG | CHANGE-DIRECTION CONSISTENT FLAG |

IMAGING DEVICE, CONTROL METHOD, AND PROGRAM

TECHNICAL FIELD

The present technology relates to an imaging device, a control method, and a program that allow a user to recognize a difference between user setting lens status set by the user for an interchangeable lens and interchangeable lens status indicating status of the interchangeable lens.

BACKGROUND ART

In the past, in an imaging system, a desired interchangeable lens has been selected from various kinds of interchangeable lenses, and the selected interchangeable lens has been attached to an imaging device. Further, in the imaging system, in a case where an interchangeable lens compatible with the imaging device is used, the imaging device obtains lens information regarding the interchangeable lens attached to the imaging device. For example, according to PTL 1, a distortion correction parameter for correcting the influence of distortion of an interchangeable lens is coded and printed on a lens cap. Then, an imaging device captures and decodes the printed two-dimensional code information to obtain the distortion correction parameter. Further, communication is performed between the interchangeable lens and the imaging device. The imaging device receives an F-stop as lens information from the interchangeable lens and transmits a control signal to the interchangeable lens to specify a desired F-stop.

CITATION LIST

Patent Literature

[PTL 1]
  JP 2009-302697A

SUMMARY

Technical Problems

Incidentally, some interchangeable lenses are not capable of communicating with imaging devices. For example, even in a case where an interchangeable lens has a function of communicating with an imaging device, the interchangeable lens may not be able to use the communication function when the interchangeable lens is attached to the imaging device via an adapter or the like. Therefore, an imaging system has a function of associating an F-stop and the like with a captured image even when the interchangeable lens is unable to use the communication function. This function allows the user to input lens setting information such as an F-stop as attached information of the captured image, for example. However, in a case where communication cannot be performed between the imaging device and the interchangeable lens and the user changes, for example, the F-stop by operating the interchangeable lens, the change in the F-stop is not transmitted from the interchangeable lens to the imaging device. This causes a difference between the interchangeable lens status and the user setting lens status, which is the lens status input and set by the user. In such a case where the interchangeable lens status and the user setting lens status are different from each other, even if the user realizes the difference after imaging, the user is unable to correct the user setting lens status unless the user remembers the interchangeable lens status at the time of imaging. Further, unless the user realizes the mistake, there is a possibility that the user may perform a process such as image editing on the basis of the wrong information regarding the lens status.

In view of the foregoing, it is an object of the present technology to provide an imaging device, a control method, and a program that allow a user to recognize a difference between user setting lens status set by the user for an interchangeable lens and interchangeable lens status indicating status of the interchangeable lens.

Solution to Problems

According to a first aspect of the present technology, an imaging device includes a control unit configured to perform an interchangeable lens status change estimation to indicate a change in status of an interchangeable lens, and configured to output warning information to a warning unit to warn a user in a case where interchangeable lens status is determined to be different from user setting lens status on the basis of a result of the interchangeable lens status change estimation.

In the present technology, the control unit performs interchangeable lens status change estimation to indicate a change in status of the interchangeable lens, and outputs warning information to the warning unit to warn a user in a case where interchangeable lens status is determined to be different from user setting lens status on the basis of a result of the interchangeable lens status estimation indicating that the interchangeable lens status has been changed, for example. Further, the control unit may detect a change in the user setting lens status. In a case where the control unit determines that any one of the interchangeable lens status and the user setting lens status has been changed, the control unit may determine that the interchangeable lens status is different from the user setting lens status. Further, in a case where the control unit detects a change in the user setting lens status and determines that a change direction of the user setting lens status and a change direction of the interchangeable lens status are different from each other, the control unit may determine that the interchangeable lens status is different from the user setting lens status. Further, the control unit may determine whether the interchangeable lens status is different from the user setting lens status on the basis of an estimated value of the interchangeable lens status calculated by the interchangeable lens status change estimation and a setting value of the user setting lens status.

As the interchangeable lens status change estimation, the control unit estimates a change in the interchangeable lens status caused by a user operation on the interchangeable lens. User operations on the interchangeable lens include an operation of adjusting the interchangeable lens, an operation of replacing the interchangeable lens, an operation related to an image stabilization function, an operation related to lens information regarding the interchangeable lens, and an operation related to a power supply.

Further, a display unit is provided to display an image captured through the interchangeable lens. On a screen of the display unit, the control unit provides a display that makes a difference in the lens status identifiable as a warning. In addition, the control unit displays the user setting lens status together with the warning, receives an operation of changing the user setting lens status being displayed, and updates the user setting lens status. Further, the control unit may display the interchangeable lens status estimated by a lens status change estimating unit, receive, as a change operation, an operation of selecting the interchangeable lens status estimated by the lens status change estimating unit, and update the user setting lens status to the estimated interchangeable lens status. Further, the control unit causes the display unit to display a lens status input screen, allowing user inputs. Further, in a case where the control unit has not issued a warning, the control unit outputs the user setting lens status together with the image captured through the interchangeable lens. In addition, the control unit associates attached information with image information of the captured image. The attached information indicates the interchangeable lens status or the user setting lens status.

According to a second aspect of the present technology, a method for controlling an imaging device includes by a control unit, performing an interchangeable lens status change estimation to indicate a change in status of an interchangeable lens, and outputting warning information to a warning unit to warn a user in a case where interchangeable lens status is determined to be different from user setting lens status on the basis of a result of the interchangeable lens status change estimation.

According to a third aspect of the present technology, a program causes a computer to execute an interchangeable lens status change estimation function of performing an interchangeable lens status change estimation to indicate a change in status of an interchangeable lens, and a warning function of outputting warning information to a warning unit to warn a user in a case where interchangeable lens status is determined to be different from user setting lens status on the basis of a result of the interchangeable lens status change estimation obtained by the interchangeable lens status change estimation function.

It is noted that the program according to the present technology can be provided to, for example, a general-purpose computer capable of executing various program codes. The program can be provided using a storage medium or communication medium that provides the program in a computer readable form. Examples of the storage medium include an optical disc, a magnetic disk, and a semiconductor memory. Examples of the communication medium include networks. With the program provided in a computer readable form, processes corresponding to the program are performed in a computer.

Advantageous Effects of Invention

According to the present technology, an interchangeable lens status change estimation is performed to indicate a change in status of an interchangeable lens. In a case where interchangeable lens status is determined to be different from user setting lens status on the basis of a result of the interchangeable lens status change estimation, warning information is output to a warning unit to warn a user. This configuration enables the user to recognize a difference between the user setting lens status and the interchangeable lens status. It is noted that the effects described in the present specification are merely examples and are not limited to those examples. Further, additional effects may be exhibited.

BRIEF DESCRIPTION OF DRAWINGS

FIG. 1 is a diagram illustrating a configuration of an imaging system.
FIG. 2 is a diagram illustrating examples of changes in interchangeable lens status.
FIG. 3 is a flowchart illustrating operation of an imaging device.
FIG. 7 is a diagram for describing another example of the second embodiment.
FIG. 8 is a diagram for describing a third embodiment.

DESCRIPTION OF EMBODIMENTS

Figure 4:
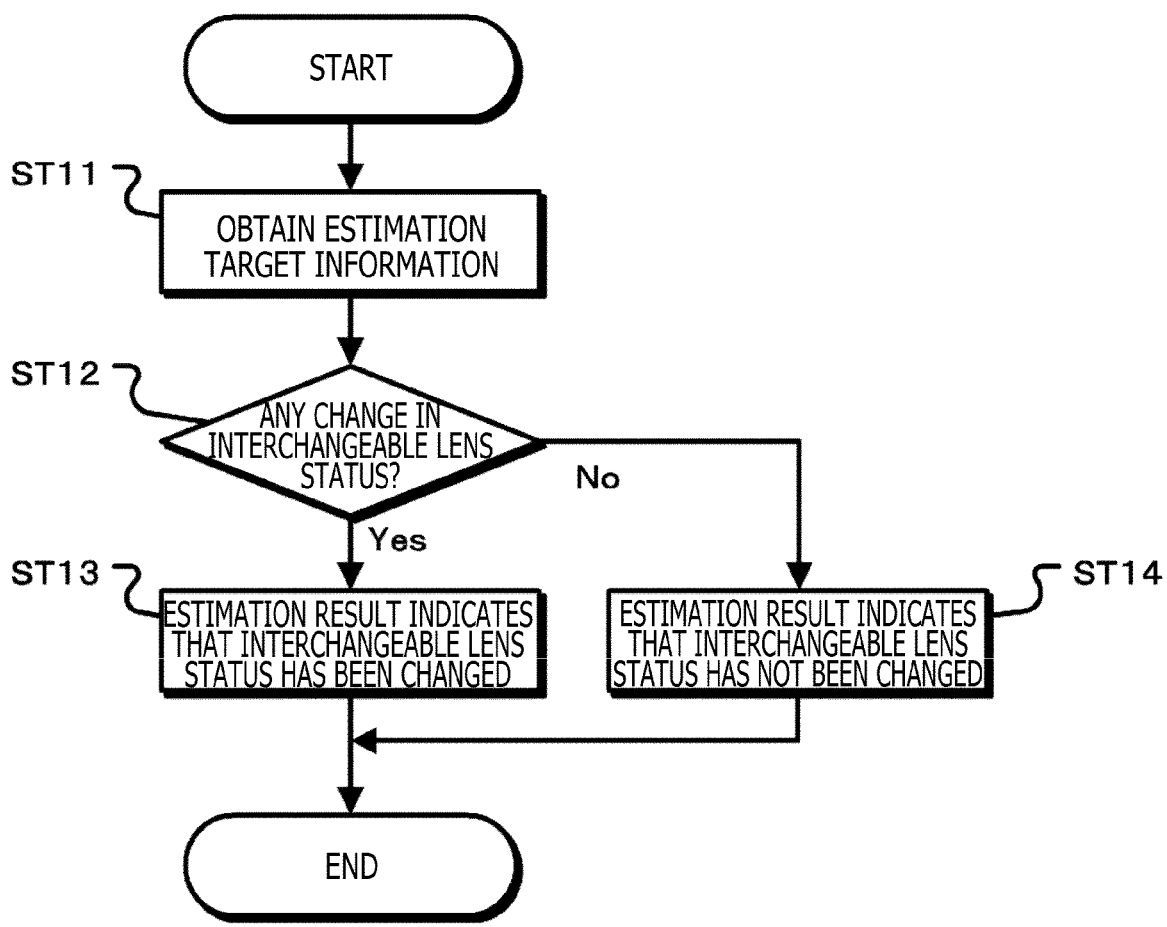
FIG. 4 is a flowchart illustrating a first embodiment.

Hereinafter, modes for carrying out the present technology will be described. It is noted that description will be made in the following order.
   1. Configuration of Imaging System
   2. Operation of Imaging Device
   2-1. First Embodiment
   2-2. Second Embodiment
   2-3. Third Embodiment
   2-4. Another Embodiment
   3. About Setting of Lens Status and Warning Operation 1. Configuration of Imaging System FIG. 1 illustrates a configuration of an imaging system. An imaging system 10 includes an interchangeable lens 21 and an imaging device 30 according to the present technology. Further, the imaging device 30 includes a mount unit 31, an imaging unit 32, an image signal processing unit 33, a display unit 34, a recording medium 35, a sensor unit 36, a user interface (I/F) unit 41, a warning unit 42, a communication unit 43, a lens communication unit 44, and a control unit 50.

The interchangeable lens 21 is configured with a focus lens, a zoom lens, or the like. The interchangeable lens 21 drives the focus lens or the zoom lens such that a subject optical image with a desired angle of view is formed on an imaging surface of the imaging unit 32. Further, the interchangeable lens 21 may include an iris (aperture) mechanism and the like. The interchangeable lens 21 is detachable, and can also employ an imaging optical system different from the above configuration. The interchangeable lens 21 includes an adjusting ring 211 (or an operating element such as an adjusting lever) to be operated by the user. Operating the adjusting ring 211 (or the adjusting lever) adjusts focusing, the focal length, or the aperture.

The mount unit 31 is configured such that the interchangeable lens 21 is attached detachably. Further, the mount unit 31 includes a connection terminal for electrically connecting the attached interchangeable lens 21 and the imaging device 30 to each other.

The imaging unit 32 is configured with an image sensor such as a CMOS (Complementary Metal Oxide Semiconductor) and a CCD (Charge Coupled Device). The imaging unit 32 performs photoelectric conversion to generate an image signal corresponding to the subject optical image, and outputs the image signal to the image signal processing unit 33.

The image signal processing unit 33 performs camera signal processes using the image signal generated by the imaging unit 32. The image signal processing unit 33 performs pre-processing, a color separation process, a resolution conversion process, a color space conversion process, and an image signal output process, for example.

As the pre-processing, the image signal processing unit 33 performs a noise removal process, a gain control process, an analog/digital conversion process, a defective pixel correction, and the like, on the image signal generated by the imaging unit 32. Further, the image signal processing unit 33 performs the color separation process. For example, in a case where the imaging unit 32 uses a mosaic color filter such as a Bayer arrangement, the image signal processing unit 33 performs a demosaicing process as the color separation process. The demosaicing process generates an image signal in which one pixel indicates each color component from an image signal in which one pixel indicates a single color component. Further, the image signal processing unit 33 performs the resolution conversion process. For example, the image signal processing unit 33 converts the image signal after the demosaicing process into an image signal with the recording resolution or into an image signal according to the display resolution of the display unit 34. Further, for example, the image signal processing unit 33 converts an image signal with the recording resolution into an image signal according to the display resolution of the display unit 34. As the color space conversion process, the image signal processing unit 33 performs a process of converting an image signal after the resolution conversion, e.g., a three primary color image signal, into a luminance signal and a color difference signal. The image signal processing unit 33 also performs a process of converting a luminance signal and a color difference signal into a three primary color image signal.

The image signal processing unit 33 associates attached information with image information of a captured image. The attached information indicates the user setting lens status or the interchangeable lens status estimated by a status change estimating unit 501, described later. Further, in a case where a warning control unit 502, described later, determines that the user setting lens status and the interchangeable lens status are different from each other, the image signal processing unit 33 may associate the attached information indicating the user setting lens status and the interchangeable lens status with the image information of the captured image. The association includes: recording both the image information of the captured image and the attached information onto an identical file; including the attached information in the image information of the captured image; and recording both image information of the captured image and the attached information onto an identical recording medium. Further, the communication unit 43, described later, may perform the association so as to transmit the image information of the captured image and the attached information together.

The image information of the captured image is not limited to an image signal after the processes performed by the image signal processing unit 33. The image information of the captured image also includes, for example, an RAW image signal, encoded data generated by performing an encoding process on the processed image signal, and encoded data generated by performing an encoding process on the RAW image signal. It is noted that the captured image is a through image or a recorded image. The through image is used to adjust the angle of view and the like at the time of imaging. The recorded image refers to an image of a desired subject imaged by the user with the adjusted angle of view for the purpose of saving. The association of the attached information with the image information of the captured image is performed for the recorded image, for example.

For example, the image signal processing unit 33 performs an encoding process on the luminance signal and the color difference signal with the recording resolution, and records the obtained encoded data onto the recording medium 35. Further, the image signal processing unit 33 performs a decoding process on the encoded data read from the recording medium 35 and performs the resolution conversion process on the obtained luminance signal and the color difference signal to output to the display unit 34. In addition, in a case where the encoded data of the captured image is recorded onto the recording medium in the Exif (Exchangeable image file format), the image signal processing unit 33 associates information indicating the user setting lens status (or the user setting lens status and the interchangeable lens status) with the encoded data of the captured image as the attached information (tag information in the Exif format). Further, the image signal processing unit 33 may associate the image information of the captured image and the attached information with each other using the UMID (Unique Material Identifier) standardized by the SMTPE (Society of Motion Picture and Television Engineers). It is noted that the user setting lens status may include a lens profile and the like. The recording medium is not limited to a recording medium fixed to or provided detachably in the imaging device 30 as described later. The recording medium may be a recording medium provided in an external device. Further, when the image signal processing unit 33 transmits the image information of the captured image to an external device (e.g., a remote control device and a terminal device such as a smartphone) that controls the imaging device 30, the image signal processing unit 33 transmits the attached information indicating the user setting lens status (or the user setting lens status and the interchangeable lens status) together with the image information of the captured image. It is noted that in a case where the attached information indicating the user setting lens status and the interchangeable lens status has been associated with the image information of the captured image, the user can operate not only the imaging device 30 but also the external device to determine whether or not the interchangeable lens status and the user setting lens status match. Further, the user can operate the external device to make the user setting lens status and the interchangeable lens status match.

It is noted that the above-described processes of the image signal processing unit 33 are merely examples, and the image signal processing unit 33 may omit a part of the above-described processes or perform a process that is not described above. Further, the captured image is not limited to a still image and may be a moving image. In a case where the captured image is a moving image, the image signal processing unit 33 may associate the user setting lens status or the information indicating both the user setting lens status and the interchangeable lens status with the captured image at a predetermined timing. For example, the image signal processing unit 33 may add the user setting lens status or the information indicating both the user setting lens status and the interchangeable lens status at the start of recording the captured image, at the end of recording the captured image, or per predetermined interval. Further, the image signal processing unit 33 may display an input screen for various settings, various kinds of information, and the like on a screen of the display unit 34 on the basis of the display information received from the control unit 50.

The display unit 34 is configured with a liquid crystal display element, an organic EL display element, or the like. The display unit 34 displays a captured image obtained by the imaging unit 32, a captured image recorded on the recording medium 35, or a through image. The through image is used to check a composition and adjust the angle of view at the time of imaging, for example. Further, the display unit 34 displays an input screen or various kinds of information. The input screen receives various settings for the functions and operations of the imaging device 30.

The recording medium 35 is fixed to or provided detachably in the imaging device 30. The recording medium 35 records image data of the captured image and encoded data of the captured image that have been generated by the imaging device 30. Further, the recording medium 35 records various kinds of information associated with the image data and the encoded data.

The sensor unit 36 is configured with a gyro sensor, an acceleration sensor, or the like. The sensor unit 36 generates a sensor signal corresponding to the movement, inclination, and the like of the imaging device 30 and outputs the sensor signal to the control unit 50.

The user interface unit 41 includes a touch panel, an operation switch, an operation button, an operation dial, a remote control signal reception unit, and the like. The user interface unit 41 generates an operation signal corresponding to a user operation and outputs the operation signal to the control unit 50. It is noted that in a case where the user interface unit 51 is configured as a touch panel, the user interface unit 51 and the display unit 34 may be integrated with each other. The user interface unit 41 receives a user input and sets the user setting lens status.

The warning unit 42 is configured with a display device, a speaker, or the like. Further, the display unit 34 may be used as the warning unit 42. On the basis of warning information received from the control unit 50, the warning unit 42 notifies the user by an image or voice that the user setting lens status and the interchangeable lens status are different from each other. It is noted that the warning unit 42 may issue a warning using the display unit 34. In addition, there is no such a limitation that the warning unit 42 is provided in the imaging device 30. For example, an external device (e.g., a remote control device and a user terminal device) may be used as the warning unit. In this case, the warning information received from the control unit 50 is transmitted to the external device by the communication unit 43. Further, the external device issues a warning by an image, voice, vibration, or the like.

By communicating with the external device (e.g., a remote control device and a user terminal device), the communication unit 43 receives operations of the imaging device and settings of the lens status from the external device, for example. Further, the communication unit 43 communicates with the external device and outputs the image information of the captured image, the attached information, and the like to the external device.

The lens communication unit 44 is configured such that the lens communication unit 44 is capable of communicating with the interchangeable lens 21 through the mount unit 31. For example, in a case where the interchangeable lens 21 has a communication function, the lens communication unit 44 supplies lens information received from the interchangeable lens 21 to the control unit 50 and supplies a lens driving signal or the like received from the control unit 50 to the interchangeable lens 21, for example.

The control unit 50 includes a CPU (Central Processing Unit), a ROM (Read Only Memory), a RAM (Random Access Memory), and the like. The ROM (Read Only Memory) stores various kinds of programs to be executed by the CPU (Central Processing Unit). The RAM (Random Access Memory) stores various kinds of parameters, the user setting lens status, the interchangeable lens status, and the like. There is no such a limitation that information indicating the user setting lens status, the interchangeable lens status, and the like is stored in the RAM of the control unit 50. The information may be stored in another functional block. The CPU executes various kinds of programs stored in the ROM. On the basis of an operation signal received from the user interface unit 41 or a signal received from the communication unit 43, the CPU controls each unit so that the operation corresponding to the operation signal or the received signal is performed in the imaging device 30. Further, for example, the control unit 50 outputs display information to the image signal processing unit 33 so that the input screen for various kinds of settings, various kinds of information, or the like are displayed on the screen of the display unit 34. It is noted that in the present specification, the user performs operation, making the imaging device operate accordingly. On the basis of a sensor signal from the sensor unit 36, the control unit 50 detects that the imaging device 30 is in a stationary state or the like.

Further, the control unit 50 performs interchangeable lens status change estimation to indicate a change in the status of the interchangeable lens. For example, in a case where the interchangeable lens 21 does not have a communication function and the control unit 50 is unable to obtain information regarding the lens status from the interchangeable lens 21, the control unit 50 performs the interchangeable lens status change estimation for the interchangeable lens. In a case where the control unit 50 determines that the interchangeable lens status is different from the user setting lens status on the basis of the result of the interchangeable lens status change estimation, the control unit 50 outputs warning information to the warning unit 42 to warn the user.

The control unit 50 includes the status change estimating unit 501 and the warning control unit 502. The status change estimating unit 501 performs the interchangeable lens status change estimation. The warning control unit 502 outputs the warning information to the warning unit 42.

The status change estimating unit 501 performs the interchangeable lens status change estimation using preset determination conditions. For example, the status change estimating unit 501 obtains estimation target information regarding a change in the interchangeable lens status. Then, on the basis of the preset determination conditions, the status change estimating unit 501 generates, for the obtained estimation target information, either an estimation result indicating whether or not the interchangeable lens status has been changed or estimation results indicating whether or not the interchangeable lens status has been changed and a change direction.

FIG. 2 illustrates examples of changes in interchangeable lens status. The operations that cause the lens status to change include: user operations on the interchangeable lens; and user operations on the imaging device. Further, the change factors that cause the lens status to change during user operations on the interchangeable lens include: an operation of adjusting the interchangeable lens; and an operation of replacing the interchangeable lens. It is noted that the operation of replacing the interchangeable lens refers to an operation of attaching a different interchangeable lens. Further, the change factors that cause the lens status to change during user operations on the imaging device include: a user setting operation related to an image stabilization function, a user operation related to lens information regarding the interchangeable lens (e.g., new input/modification of lens name), and an operation related power supply. The status change estimating unit 501 generates estimation results for the items included in the change factors that cause the lens status to change.

The status change estimating unit 501 estimates the F-stop of the interchangeable lens 21, for example. The F-stop can be estimated using, for example, the method disclosed in JP 2006-259055A. That is, an external illuminometer whose F-stop is known is provided. The measured value of the external illuminometer is compared with the measured value of the illuminance calculated from the image signal generated by the imaging unit 32. Alternatively, the measured value of the external illuminometer is compared with the measured value of an internal illuminometer provided in the status change estimating unit 501. Then, the F-stop of the interchangeable lens 21 is estimated. Further, the status change estimating unit 501 may estimate the F-stop on the basis of the degree of local blur in the captured image. For example, in a case where an area distant from a subject of interest is less blurred, the status change estimating unit 501 estimates that the aperture is narrowed down and the F-stop (F-number) is large. In a case where an area close to the subject of interest is blurred, the status change estimating unit 501 estimates that the aperture is opened and the F-stop (F-number) is small. Further, the status change estimating unit 501 may estimate the F-stop using, for example, the difference in the amount of light between the central portion and the peripheral portion of the captured image. In addition, using the estimated F-stop as the estimation target information, the status change estimating unit 501 generates an estimation result based on the preset determination condition. In other words, the status change estimating unit 501 generates a determination result indicating whether or not the F-stop has been changed. Further, the status change estimating unit 501 may use the change direction of the F-stop (whether the F-stop has been increased or decreased) as the estimation result.

The status change estimating unit 501 estimates the focal length on the basis of the result of detection of the subject distance. For example, on the basis of the subject distance in the captured image previously recorded, that is the captured image previously imaged, the status change estimating unit 501 estimates the subject distance in the current imaging from the difference in the size of the image of the subject of interest between the captured image previously imaged and the current imaging. Further, in a case where the angle of view of the interchangeable lens 21 is known and the size of the subject of interest imaged is known, the status change estimating unit 501 may estimate the subject distance from the size of the subject of interest and the size of the subject of interest in the captured image. For example, as recited in JP 2009-31870A, the angle of view can be identified from the relationship between the focal length of the lens and the size of the image forming surface (imaging surface). Further, the relationship between the size of the subject and the size of the subject in the captured image is identified from the angle of view and the subject distance. Therefore, as long as the angle of view, the size of the subject of interest, and the size of the subject of interest in the captured image are known, the subject distance can be calculated. Further, the subject distance, the size of the image forming surface (imaging surface), the size of the subject of interest, and the size of the subject of interest in the captured image are known, the focal length can be estimated. It is noted that, for example, the date and time of imaging can be added to the captured image so that the captured image last generated, that is, the captured image previously recorded can be identified using the date and time of imaging. Further, for example, image identification information including a sequence number may be added to the captured image, so that the captured image last generated, that is, the captured image previously recorded can be identified from the sequence number. The sequence number is included in the file name and indicates the order of recording. Using the estimated focal length or the subject distance as the estimation target information, the status change estimating unit 501 generates an estimation result, that is, a determination result based on the preset determination condition. The determination result indicates whether or not the focal length or the subject distance has been changed. Further, the status change estimating unit 501 may use the change direction of the focal length or the subject distance (whether the focal length or the subject distance has been increased or decreased) as the estimation result.

The status change estimating unit 501 estimates the lateral chromatic aberration and the like as the interchangeable lens status by calculating, for example, the amount of deviation of a red image or a blue image with respect to a green image at an edge portion of the subject in the image. Further, since the lateral chromatic aberration and the like are different when the lens characteristics of the interchangeable lens are different, the status change estimating unit 501 uses the estimated lateral chromatic aberration and the like as the estimation target information to generate an estimation result, that is, a determination result based on the preset determination condition. The determination result indicates whether or not the lateral chromatic aberration has been changed.

The status change estimating unit 501 generates a result of the interchangeable lens status change estimation according to the time elapsed since the previous imaging and a user operation on the imaging device.

In the interchangeable lens status change estimation using the time elapsed since the previous imaging, for example, in a case where the time elapsed since the previous imaging is shorter than the preset shortest time Th1 (e.g., approximately one second), the user is less likely to have changed the interchangeable lens or less likely to have changed the lens status by operating the adjusting ring 211 or the like of the interchangeable lens. As an estimation result based on the determination condition, therefore, the status change estimating unit 501 uses the result of comparison between the time elapsed since the previous imaging and the shortest time Th1. In a case where the elapsed time is equal to or shorter than the shortest time Th1, the status change estimating unit 501 estimates that the interchangeable lens status has not been changed. In a case where the elapsed time is longer than the shortest time Th1, the status change estimating unit 501 estimates that the interchangeable lens status has been changed.

In addition, when the user images a desired subject, in a case where the user images a plurality of still images while changing the aperture, the focal length, and the like, as necessary, there may be a case where the interchangeable lens status is changed while the time elapsed since the previous imaging is shorter than the preset longest time Th2 (e.g., approximately one minute). As an estimation result based on the determination condition, therefore, the status change estimating unit 501 uses the result of comparison between the time elapsed since the previous imaging and the longest time Th2. In a case where the elapsed time is shorter than the preset longest time Th2, the status change estimating unit 501 estimates that the interchangeable lens status has been changed.

In a case where the interchangeable lens is changed, there is a high possibility that the interchangeable lens being used is different in lens performance from the interchangeable lens used at the previous imaging. Using an interchangeable lens with a different lens performance causes a change in the interchangeable lens status. As an estimation result based on the determination condition, therefore, the status change estimating unit 501 uses a determination result indicating whether or not the lens has been attached or detached. In a case where the lens has been attached or detached, the status change estimating unit 501 estimates that the interchangeable lens status has been changed.

Further, in a case where the user searches for a new subject to capture an image thereof, there is a possibility that the user has changed the interchangeable lens status. Further, because the user searches for a new subject, the time elapsed since the previous imaging becomes longer. Therefore, in a case where the elapsed time is longer than preset switching time Th3 (>longest time Th2), the interchangeable lens status may have been changed in capturing an image of a new subject. Further, in a case where the elapsed time is longer than the switching time Th3, it is expected that the lens has been replaced. As an estimation result based on the determination condition, therefore, the status change estimating unit 501 uses the result of comparison between the time elapsed since the previous imaging and the switching time Th3. In a case where the elapsed time is longer than the switching time Th3, the status change estimating unit 501 may estimate that the interchangeable lens status has been changed.

In a case where the imaging device includes a sensor-shift image stabilization function or an electronic image stabilization function, the imaging device can perform image stabilization irrespective of the interchangeable lens 21 being used. The sensor-shift image stabilization function performs image stabilization by moving an image sensor. The electronic image stabilization function performs image stabilization by controlling the position of reading an image signal. In the imaging device including such an image stabilization function, in a case where the focal length of the attached interchangeable lens 21 is different, the amount of image stabilization becomes different. For example, in a case where the interchangeable lens 21 is a telephoto lens, the amount of image stabilization with respect to the amount of movement is larger than a case where the interchangeable lens 21 is a wide angle lens. Therefore, the imaging device including the image stabilization function allows setting of the lens focal length. In a case where the set lens focal length and the focal length of the interchangeable lens 21 are different, the imaging device cannot perform optimal image stabilization. As an estimation result based on the determination condition, therefore, therefore, the status change estimating unit 501 uses a determination result indicating whether or not the setting of the image stabilization function has been changed. In a case where the setting has been changed, the status change estimating unit 501 estimates that the interchangeable lens status has been changed.

In a case where the imaging device has a function for inputting lens information, when the lens is replaced, normally, the user newly inputs or modifies lens information such as, for example, the lens name and lens characteristics. As an estimation result based on the determination condition, therefore, the status change estimating unit 501 uses a determination result indicating, for example, whether or not the lens name has been newly input or modified. In a case where the lens name has been newly input or modified, the status change estimating unit 501 estimates that the interchangeable lens status has been changed.

When imaging is performed for the first time after the power is turned from off to on, the user may operate the lens to image a new subject, causing a change in the lens status from the previous imaging. As an estimation result based on the determination condition, therefore, the status change estimating unit 501 uses a determination result indicating whether or not the power has been turned on. In a case where the power has been turned on, the status change estimating unit 501 estimates that the interchangeable lens status has been changed.

It is noted that the changes in the interchangeable lens status illustrated in FIG. 2 are examples. As long as the difference between the interchangeable lens status and the user setting lens status can be determined, it is possible to use another estimation target information or another determination condition. For example, the captured image obtained through the interchangeable lens 21 reflects the lens status of the interchangeable lens 21. Accordingly, when the lens status of the interchangeable lens 21 changes, the captured image corresponds to the changed interchangeable lens status. Therefore, the status change estimating unit 501 may use the captured image obtained through the interchangeable lens 21 as the estimation target information. For example, the status change estimating unit 501 calculates the difference between a through image and a previously recorded image. In a case where the difference is greater than a preset threshold value, the status change estimating unit 501 determines that the interchangeable lens status has been changed. In addition, the status change estimating unit 501 calculates frequency characteristics of a through image and frequency characteristics of a previously recorded image. In a case where the difference in the frequency characteristics is greater than a preset threshold value, the status change estimating unit 501 determines that the interchangeable lens status has been changed. Further, in a case where a scene change is detected in a through image, the user may have changed the interchangeable lens status when imaging a new subject. Therefore, the status change estimating unit 501 may use the result of detection of scene change using the captured image as an estimation result. In a case where the scene change is detected, the status change estimating unit 501 may estimate that the interchangeable lens status has been changed. It is noted that there is no such a limitation that the status change estimating unit 501 generates the estimation results for all the items illustrated in FIG. 2. The status change estimating unit 501 may generate estimation results for part of the items.

Further, the status change estimating unit 501 may detect a change in the user setting lens status. For example, the status change estimating unit 501 detects a change in the user setting lens status between the user setting lens status and the user setting lens status after predetermined time elapses. In a case where the lens status does not match, the status change estimating unit 501 generates a detection result indicating that the user setting lens status has been changed.

In addition, as described later, the status change estimating unit 501 generates status change information (e.g., estimation results and flags) on the basis of the result of the interchangeable lens status change estimation or on the basis of both the result of the interchangeable lens status change estimation and the result of the user setting lens status change detection.

The warning control unit 502 determines whether there is a difference between a change in the interchangeable lens status and a change in the user setting lens status on the basis of the status change information generated by the status change estimating unit 501. In a case where the warning control unit 502 determines that there is a difference in the status change, the warning control unit 502 generates warning information and outputs the warning information to the warning unit 42.

2. Operation of Imaging Device

Next, the operation of the imaging device will be described. FIG. 3 is a flowchart illustrating the operation of the imaging device. The control unit 50 of the imaging device 30 starts a warning control operation in the flowchart illustrated in FIG. 3 at a predetermined timing such as before imaging. For example, the control unit 50 starts the flowchart illustrated in FIG. 3 at the timing when the user has determined composition and is likely to start imaging. The control unit 50 starts the operation in the flowchart at the timing when the user is likely to start imaging: for example, at the timing when the control unit 50 detects that a shutter button is half-pressed; or at the timing when the gyro sensor, the acceleration sensor, or the like detects that the imaging device is stationary after the user has determined composition by performing panning, tilting and/or zooming operation.

In step ST1, the control unit obtains status change information regarding a change in the lens status. From the status change estimating unit 501, the warning control unit 502 of the control unit 50 obtains the status change information regarding a change in the interchangeable lens status or both a change in interchangeable lens status and a change in the user setting lens status. Then, the process proceeds to step ST2.

In step ST2, the control unit determines whether there is a difference in the status change. On the basis of the status change information obtained in step ST1, the warning control unit 502 of the control unit 50 determines whether there is a difference between the change in the interchangeable lens status and the change in the user setting lens status. In a case where the warning control unit 502 determines that there is a difference in the lens status change, the process proceeds to step ST3. In a case where the warning control unit 502 determines that there is no difference in the lens status change, the warning control unit 502 ends the warning control operation.

In step ST3, the control unit issues a warning. The warning control unit 502 of the control unit 50 generates warning information and supplies the warning information to the warning unit 42. Then, the warning unit 42 issues a notification by an image, voice, vibration, or the like that there is a difference between the interchangeable lens status and the user setting lens status.

2-1. First Embodiment

Next, the first embodiment of the operation of generating the status change information obtained by the control unit 50 in step ST1 in FIG. 3 will be described. In the first embodiment, the result of the interchangeable lens status change estimation is generated as the status change information.

FIG. 4 is a flowchart illustrating the first embodiment. In step ST11, the status change estimating unit obtains estimation target information. As the estimation target information, the status change estimating unit 501 obtains, for example, estimated values such as an F-stop and focal length, the elapsed time, information regarding whether the lens has been attached or detached, setting status of the image stabilization function, and user setting information. Then, the process proceeds to step ST12.

In step ST12, the status change estimating unit determines whether the interchangeable lens status has been changed. Using the estimation target information obtained in step ST11, the status change estimating unit 501 determines whether the interchangeable lens status has been changed on the basis of the preset determination conditions. In a case where the status change estimating unit 501 determines that there is a change, the process proceeds to step ST13. In a case where the status change estimating unit 501 determines that there is no change, the process proceeds to step ST14.

In step ST13, the status change estimating unit determines the estimation result, which is the status change information, that the interchangeable lens status has been changed. In step ST14, the status change estimating unit determines the estimation result, which is the status change information, that the interchangeable lens status has not been changed.

When the process illustrated in FIG. 4 ends, the process proceeds to step ST2 in FIG. 3. The warning control unit 502 of the control unit 50 determines whether there is a difference in the status change on the basis of the status change information (estimation result) obtained in step ST1. In a case where the status change information obtained from the status change estimating unit 501 indicates that the interchangeable lens status has been changed, the warning control unit 502 determines that there is a difference between the change in the interchangeable lens status and the change in the user setting lens status and issues a warning. Further, in a case where the obtained status change information does not indicate that the interchangeable lens status has been changed, the warning control unit 502 determines that there is no difference and does not issue a warning.

In this manner, according to the first embodiment, the interchangeable lens status change estimation is performed to indicate a change in the status of the interchangeable lens. In a case where a change in the interchangeable lens status is determined to be different from a change in the user setting lens status on the basis of the result of the interchangeable lens status change estimation, a warning is issued by an image, voice, or the like. For example, in a case where the result of the interchangeable lens status change estimation indicates that the interchangeable lens status has been changed, the interchangeable lens status is determined to be different from the user setting lens status and a warning is issued by an image, voice, or the like. This configuration enables the user to recognize the difference between the user setting lens status and the interchangeable lens status. Further, issuing a warning prompts the user to update the user setting lens status. Therefore, correct lens status is associated with the captured image. For example, when the user images a desired subject, the user may image a plurality of still images by changing the aperture of the interchangeable lens for each image. However, the user may forget updating the user setting lens status even though the user has operated and changed the aperture. In this case, a warning is issued. Therefore, it is possible to prompt the user to associate correct lens status with the captured image.

2-2. Second Embodiment

Next, the second embodiment will be described. In the imaging system, the interchangeable lens status is changed by the lens operation on the interchangeable lens. Further, the user setting lens status is updated by the user in accordance with the lens operation. Here, in a case where the user has changed the interchangeable lens status by operating the lens during a state where the interchangeable lens status and the user setting lens status match, unless the user updates the user setting lens status in accordance with the lens operation, the interchangeable lens status and the user setting lens status do not match. Further, when the user has changed the user setting lens status, unless the user operates the interchangeable lens in accordance with the change in the user setting lens status, the interchangeable lens status and the user setting lens status do not match. Therefore, in the second embodiment, in a case where a change in the user setting lens status is detected and any one of the interchangeable lens status and the user setting lens status is changed, it is determined that the interchangeable lens status is different from the user setting lens status and the user is warned. For example, the status change estimating unit performs the interchangeable lens status change estimation and user setting lens status change detection. On the basis of the estimation result and the detection result, the status change estimating unit sets a flag (change consistency flag) with regard to whether or not the lens status has been changed. The flag indicates whether the interchangeable lens status and the user setting lens status are consistent. Then, the set flag is used as the status change information.

Figure 5:
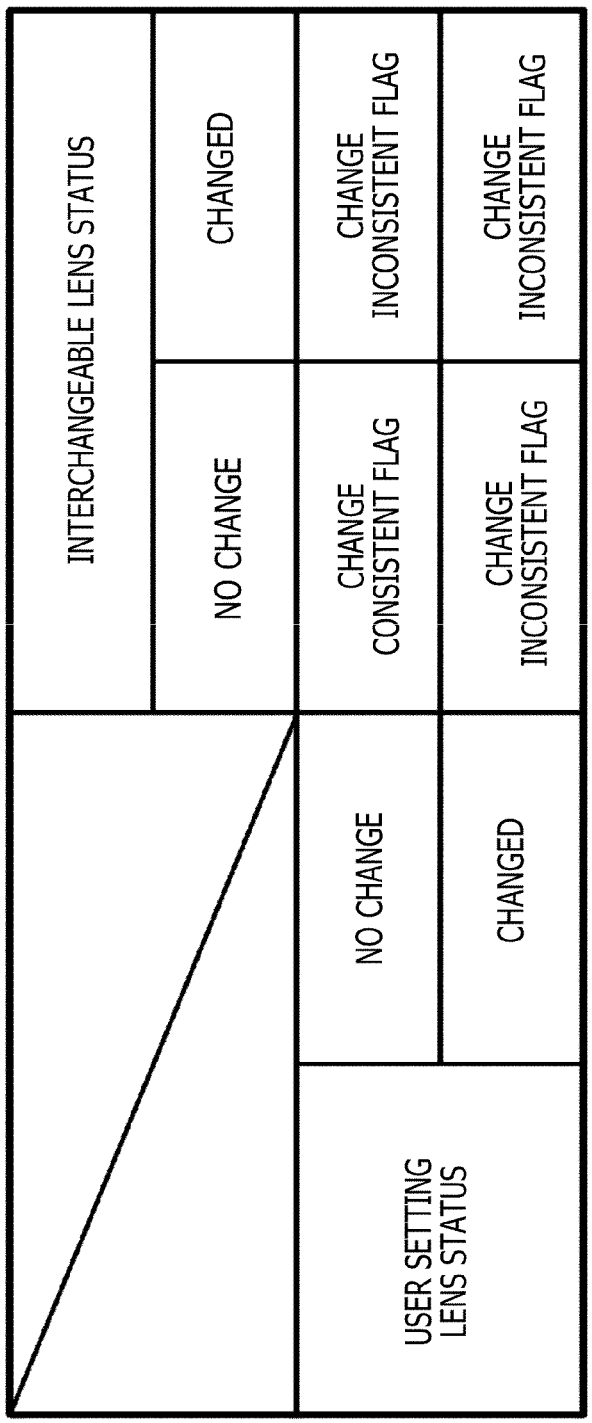
FIG. 5 is a diagram for describing a second embodiment.

FIG. 5 is a diagram for describing the second embodiment. In a case where neither the interchangeable lens status nor the user setting lens status has been changed, the status change estimating unit 501 determines that there is consistency therebetween and sets a change consistent flag. Further, in a case either the user setting lens status or the interchangeable lens status has been changed, the status change estimating unit 501 determines that there is no consistency therebetween and sets a change inconsistent flag.

Figure 6:
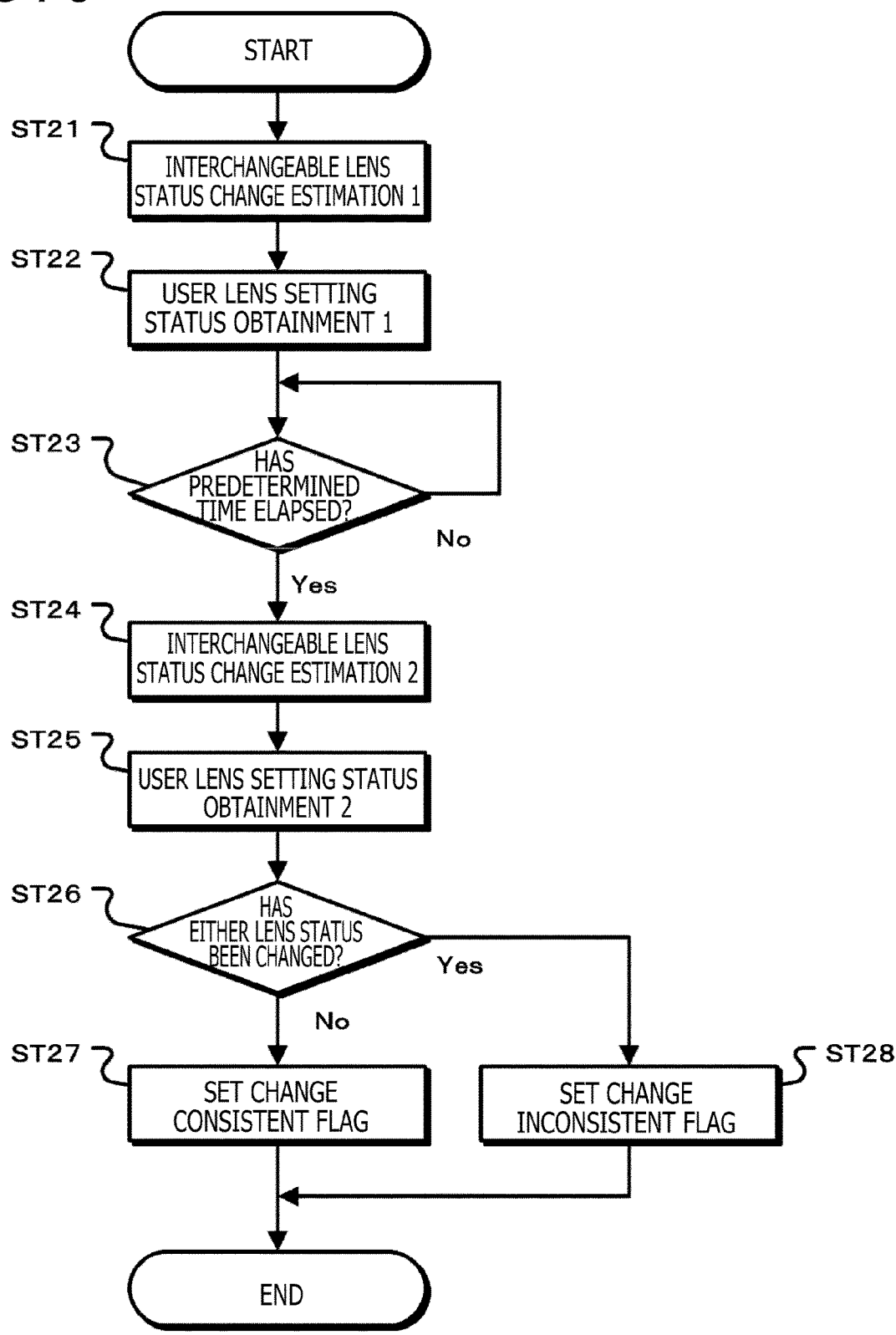
FIG. 6 is a flowchart illustrating the second embodiment.

FIG. 6 is a flowchart illustrating the second embodiment. In step ST21, the status change estimating unit 501 performs interchangeable lens status estimation 1. In the interchangeable lens status estimation 1, the status change estimating unit 501 obtains estimation target information, and the process proceeds to step ST22. It is noted that the obtained estimation target information is set as first estimation target information.

In step ST22, the status change estimating unit performs user setting lens status obtainment 1. In the user setting lens status obtainment 1, the status change estimating unit 501 obtains the user setting lens status stored in the control unit 50 or the like, and the process proceeds to step ST23. It is noted that the obtained information is set as first obtainment information.

In step ST23, the status change estimating unit determines whether predetermined time has elapsed. The status change estimating unit 501 determines whether the predetermined time has elapsed since obtainment of the first estimation target information and the first obtainment information. In a case where the predetermined time has not elapsed, the process returns to step ST23. In a case where the predetermined time has elapsed, the process proceeds to step ST24.

In step ST24, the status change estimating unit performs interchangeable lens status estimation 2. In the interchangeable lens status estimation 2, the status change estimating unit 501 obtains the estimation target information, and the process proceeds to step ST25. It is noted that the obtained estimation target information is set as second estimation target information.

In step ST25, the status change estimating unit performs user setting lens status obtainment 2. In the user setting lens status obtainment 2, the status change estimating unit 501 obtains the user setting lens status stored in the control unit 50 or the like, and the process proceeds to step ST26. It is noted that the obtained information is set as second obtainment information.

In step ST26, the status change estimating unit determines whether either of the lens status has been changed. The status change estimating unit 501 estimates a change in the interchangeable lens status on the basis of the first estimation target information and the second estimation target information. Further, the status change estimating unit 501 detects a change in the user setting lens status on the basis of the first obtainment information and the second obtainment information. In a case where the status change estimating unit 501 determines on the basis of the estimation result and the determination result that neither the interchangeable lens status nor the user setting lens status has been changed, the process proceeds to step ST27. Further, in a case where the status change estimating unit 501 determines on the basis of the estimation result and the determination result that at least one of the interchangeable lens status or the user setting lens status has been changed, the process proceeds to step ST28.

In step ST27, the status change estimating unit sets the change consistent flag. Since neither the interchangeable lens status nor the user setting lens status has been changed, the status change estimating unit 501 sets the change consistent flag under estimation that there is consistency in the changes therebetween.

In step ST28, the status change estimating unit sets the change inconsistent flag. Since at least one of the interchangeable lens status or the user setting lens status has been changed, the status change estimating unit 501 determines that there is no consistency in the changes therebetween and sets the change inconsistent flag.

It is noted that either the process in step ST21 or the process in step ST22 may be performed first. It is noted that either the process in step ST24 or the process in step ST25 may be performed first.

When the process illustrated in FIG. 6 ends, the process proceeds to step ST2 in FIG. 3. The warning control unit 502 of the control unit 50 determines whether there is any difference in the lens status changes on the basis of the status change information obtained in step ST1. In a case where the status change information obtained from the status change estimating unit 501 indicates the change inconsistent flag, the warning control unit 502 determines that there is a difference between the change in the interchangeable lens status and the change in the user setting lens status and issues a warning. Further, in a case where the obtained status change information indicates the change consistent flag, the warning control unit 502 determines that there is no difference and does not issue a warning.

It is noted that in the second embodiment, in a case where both the interchangeable lens status and the user setting lens status have been changed, it is also possible to set the change consistent flag under estimation that there is consistency in the changes therebetween. FIG. 7 is a diagram for describing another example in the second embodiment. In this case, in step ST26 in FIG. 6, the status change estimating unit determines whether only one of the lens status has been changed, instead of determining whether either of the lens status has been changed. That is, the status change estimating unit 501 estimates a change in the interchangeable lens status on the basis of the first estimation target information and the second estimation target information. Further, the status change estimating unit 501 detects a change in the user setting lens status on the basis of the first obtainment information and the second obtainment information. In addition, in a case where the status change estimating unit 501 determines on the basis of the estimation result and the determination result that neither the interchangeable lens status nor the user setting lens status has been changed, or that both the interchangeable lens status and the user setting lens status have been changed, the process proceeds to step ST27. Further, in a case where the status change estimating unit 501 determines on the basis of the estimation result and the determination result that only one of the interchangeable lens status and the user setting lens status has been changed, the process may proceed to step ST28.

In this manner, according to the second embodiment, even in a case where the user setting lens status has been changed, the warning is issued by an image, voice, or the like when there is a difference between a change in the interchangeable lens status and a change in the user setting lens status. This configuration enables the user to recognize the difference between the user setting lens status and the interchangeable lens status. Further, issuing a warning prompts the user to update the user setting lens status. Therefore, correct lens status is associated with the captured image. Further, repeating the processes in the second embodiment can issue a warning when the operation performed by the user during the use of the imaging system causes a difference between a change in the interchangeable lens status and a change in the user setting lens status.

2-3. Third Embodiment

Incidentally, a change in the interchangeable lens status and a change in the user setting lens status may have directionality. For example, an F-stop is changed in a direction to increase the F-stop and in a direction to decrease the F-stop. Further, a change in the focal length or subject distance also has directionality. Therefore, in the third embodiment, in a case where a change in the user setting lens status is detected and it is determined that a change direction of the user setting lens status and a change direction of the interchangeable lens status are different from each other, it is determined that the interchangeable lens status is different from the user setting lens status and the user is warned. For example, the status change estimating unit performs the interchangeable lens status change estimation and user setting lens status change detection including the change direction. The status change estimating unit sets a flag (change-direction consistency flag) with regard to whether or not the lens status has been changed. The flag indicates whether there is consistency between the change in the interchangeable lens status and the change in the user setting lens status including the change direction. Then, the set flag is used as the status change information.

FIG. 8 is a diagram for describing the third embodiment. In a case where neither the interchangeable lens status nor the user setting lens status has been changed, the status change estimating unit 501 determines that there is consistency therebetween and sets a change-direction consistent flag. Further, in a case where both the interchangeable lens status and the user setting lens status have been changed in the positive direction (e.g., direction to increase the F-stop) or in the negative direction (e.g., direction to decrease the F-stop), the status change estimating unit 501 determines that there is a consistency therebetween and sets the change-direction consistent flag. In a case where one of the interchangeable lens status and the user setting lens status has been changed in the positive direction while the other has been changed in the negative direction, the status change estimating unit 501 determines that there is no consistency therebetween and sets a change-direction inconsistent flag. In addition, in a case where only one of the interchangeable lens status and the user setting lens status has been changed, the status change estimating unit 501 determines that there is no consistency therebetween and sets the change-direction inconsistent flag.

Figure 9:
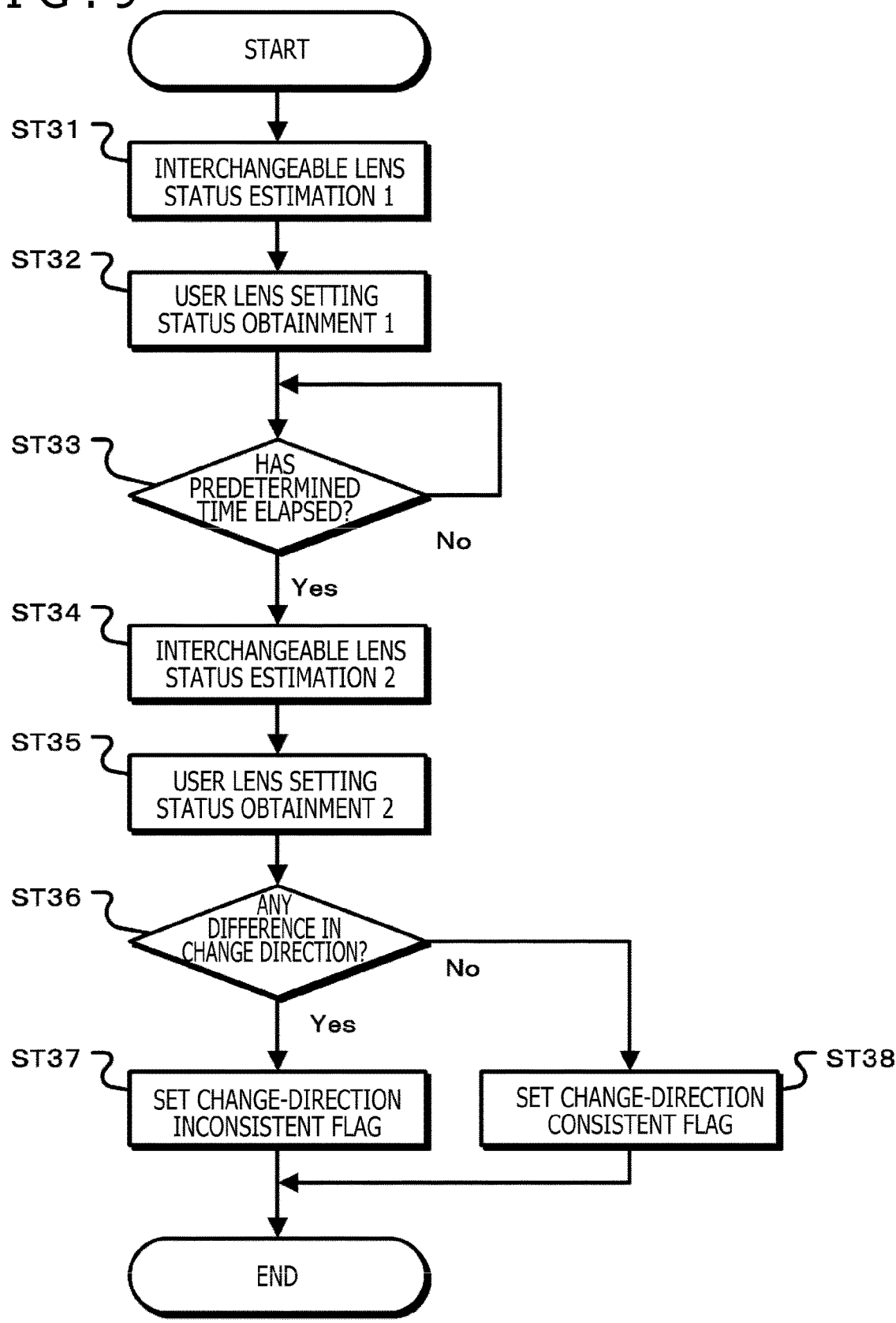
FIG. 9 is a flowchart illustrating the third embodiment.

FIG. 9 is a flowchart illustrating the third embodiment. In step ST31, the status change estimating unit 501 performs the interchangeable lens status estimation 1. In the interchangeable lens status estimation 1, the status change estimating unit 501 obtains estimation target information, and the process proceeds to step ST32. It is noted that the obtained estimation target information is set as the first estimation target information.

In step ST32, the status change estimating unit performs the user setting lens status obtainment 1. In the user setting lens status obtainment 1, the status change estimating unit 501 obtains the user setting lens status stored in the control unit 50 or the like, and the process proceeds to step ST33. It is noted that the obtained information is set as the first obtainment information.

In step ST33, the status change estimating unit determines whether predetermined time has elapsed. The status change estimating unit 501 determines whether the predetermined time has elapsed since obtainment of the first estimation target information and the first obtainment information. In a case where the predetermined time has not elapsed, the process returns to step ST33. In a case where the predetermined time has elapsed, the process proceeds to step ST34.

In step ST34, the status change estimating unit performs the interchangeable lens status estimation 2. In the interchangeable lens status estimation 2, the status change estimating unit 501 obtains estimation target information, and the process proceeds to step ST35. It is noted that the obtained estimation target information is set as the second estimation target information.

In step ST35, the status change estimating unit performs the user setting lens status obtainment 2. In the user setting lens status obtainment 2, the status change estimating unit 501 obtains the user setting lens status stored in the control unit 50 or the like, and the process proceeds to step ST36. It is noted that the obtained information is set as the second obtainment information.

In step ST36, the status change estimating unit determines whether there is a difference in the change direction of the lens status. The status change estimating unit 501 estimates a change in the interchangeable lens status including the change direction on the basis of the first estimation target information and the second estimation target information. Further, the status change estimating unit 501 detects a change in the user setting lens status including the change direction on the basis of the first obtainment information and the second obtainment information. In a case where the status change estimating unit 501 determines on the basis of the estimation result and the determination result that the change direction of the interchangeable lens status and the change direction of the user setting lens status are different from each other, in other words, in a case where only one of the interchangeable lens status and the user setting lens status has been changed, and in a case where one of the interchangeable lens status and the user setting lens status has been changed in the positive direction while the other has been changed in the negative direction, the process proceeds to step ST37. Further, in a case where the status change estimating unit 501 determines that the change directions of the interchangeable lens status and the user setting lens status are the same, in other words, in a case where neither the interchangeable lens status nor the user setting lens status has been changed and in a case where both the interchangeable lens status and the user setting lens status have been changed in the same direction, the process proceeds to step ST38.

An F-stop is one of the user setting lens status. For example, when the user has changed the F-stop from "F5.6" to "F2.8" in the direction to open the aperture, the status change estimating unit 501 determines that there is a change in the user setting lens status. Further, in a case where the status change estimating unit 501 detects that a previous luminance average value "Bd (e.g., a value corresponding to F5.6)" has been decreased to a luminance average value "Be (e.g., a value corresponding to F11)" due to the user operation performed in the direction to close the aperture, the status change estimating unit 501 determines that there is a change in the interchangeable lens status. In addition, while the user setting lens status has been changed in the direction to open the aperture from the F-stop "F5.6" to "F2.8," the interchangeable lens status has been changed in the direction to decrease the luminance average value from the luminance average value "Bd (e.g., a value corresponding to F5.6)" to the luminance average value "Be (e.g., a value corresponding to F11)." Therefore, the status change estimating unit 501 determines that there is a difference in the change direction. Then, the process proceeds to step ST37. Further, in a case where the status change estimating unit 501 detects that the previous luminance average value "Bd (e.g., a value corresponding to F5.6)" has been increased to a luminance average value "Bc (e.g., a value corresponding to F2.8)" due to the user operation performed in the direction to open the aperture, the status change estimating unit 501 determines that the change directions are the same since the user setting lens status has been changed in the direction to open the aperture from the F-stop "F5.6" to "F2.8" and the interchangeable lens status has been changed in the direction to increase the luminance average value from the luminance average value "Bd (e.g., a value corresponding to F5.6)" to the luminance average value "BC (e.g., a value corresponding to F2.8)." Then, the process proceeds to step ST38. It is noted that in a case where the estimation target information or the obtainment information is the F-stop or the like, a change is made in the positive direction or negative direction. However, in the lens status change estimation based on the elapsed time or the like, a change is not in the positive direction or negative direction. Therefore, in the lens status change estimation based on the elapsed time or the like, the status change estimating unit 501 just needs to process all the change directions as the positive direction, for example. Further, the user setting lens status does not include information regarding the attachment/detachment of the lens or power on, for example. Therefore, when processing, these pieces of information are excluded from the estimation target information.

In step ST37, the status change estimating unit sets the change inconsistent flag. Since the determination results indicating whether or not there has been a change or the change directions are different between the interchangeable lens status and the user setting lens status, the status change estimating unit 501 estimates that there is no consistency in the changes including the directions and sets the change-direction inconsistent flag.

In step ST38, the status change estimating unit sets the change-direction consistent flag. Since the determination results indicating whether or not there has been a change and the change directions are the same between the interchangeable lens status and the user setting lens status, the status change estimating unit 501 estimates that there is consistency in the changes including the directions and sets the change-direction consistent flag.

It is noted that either the process in step ST31 or the process in step ST32 may be performed first. Further, either the process in step ST34 or the process in step ST35 may be performed first.

When the process illustrated in FIG. 9 ends, the process proceeds to step ST2 in FIG. 3. The warning control unit 502 of the control unit 50 determines whether there is any difference in the lens status changes on the basis of the status change information obtained in step ST1. In a case where the status change information obtained from the status change estimating unit 501 indicates the change-direction inconsistent flag, the warning control unit 502 determines that there is a difference between a change in the interchangeable lens status and a change in the user setting lens status and issues a warning. Further, in a case where the obtained status change information indicates the change-direction consistent flag, the warning control unit 502 determines that there is no difference and does not issue a warning.

In this manner, according to the third embodiment, in a case where only one of the interchangeable lens status and the user setting lens status has been changed and a difference is generated between the interchangeable lens status and the user setting lens status, and in a case where both the interchangeable lens status and the user setting lens status have been changed in directions different from each other and a difference is generated between the interchangeable lens status and the user setting lens status, a warning is issued by an image, voice, or the like. This configuration enables the user to recognize the difference between the user setting lens status and the interchangeable lens status. Further, issuing a warning prompts the user to update the user setting lens status. Therefore, correct lens status is associated with the captured image.

Further, two or more of the above first to third embodiments may be combined and, in either thereof, in a case where there is a difference between the interchangeable lens status and the user setting lens status, a warning may be issued.

2-5. Another Embodiment

A desired subject may be imaged repeatedly by changing the aperture or the like of the interchangeable lens. In this case, a difference generated by the change in the interchangeable lens status is small, compared to a case where different scenes are imaged. Therefore, a scene change determination threshold value may be set in advance in accordance with a difference that would be generated when different scenes are imaged. A warning may not be issued when the calculated difference is larger than the scene change determination threshold value. In this way, only when a desired subject is imaged repeatedly by changing the aperture or the like of the interchangeable lens, a warning can be issued according to the difference in the lens status. Further, in a case where the calculated difference is larger than the scene change determination threshold value, the control unit may, for example, instruct the user to confirm the interchangeable lens status and the user setting lens status. In this manner, when the user images a new scene, the interchangeable lens status and the user setting lens status can match.

Further, as the status change information, the status change estimating unit 501 may use an estimated value of the lens status (e.g., an estimated F-stop or a focal length) and a setting value of the user setting lens status (e.g., an F-stop or a focal length set by the user.). The estimated value of the lens status is calculated by the interchangeable lens status change estimation. In this case, in a case where the estimated value and the setting value indicated by the status change information are different from each other, the warning control unit 502 determines that there is a difference between the change in the interchangeable lens status and the change in the user setting lens status and issues a warning. Further, in a case where the estimated value and the setting value indicated by the obtained status change information match and the obtained status change information indicates the change-direction consistent flag, the warning control unit 502 determines that there is no difference and does not issue a warning.

3. About Setting of Lens Status and Warning Operation

Figure 10:
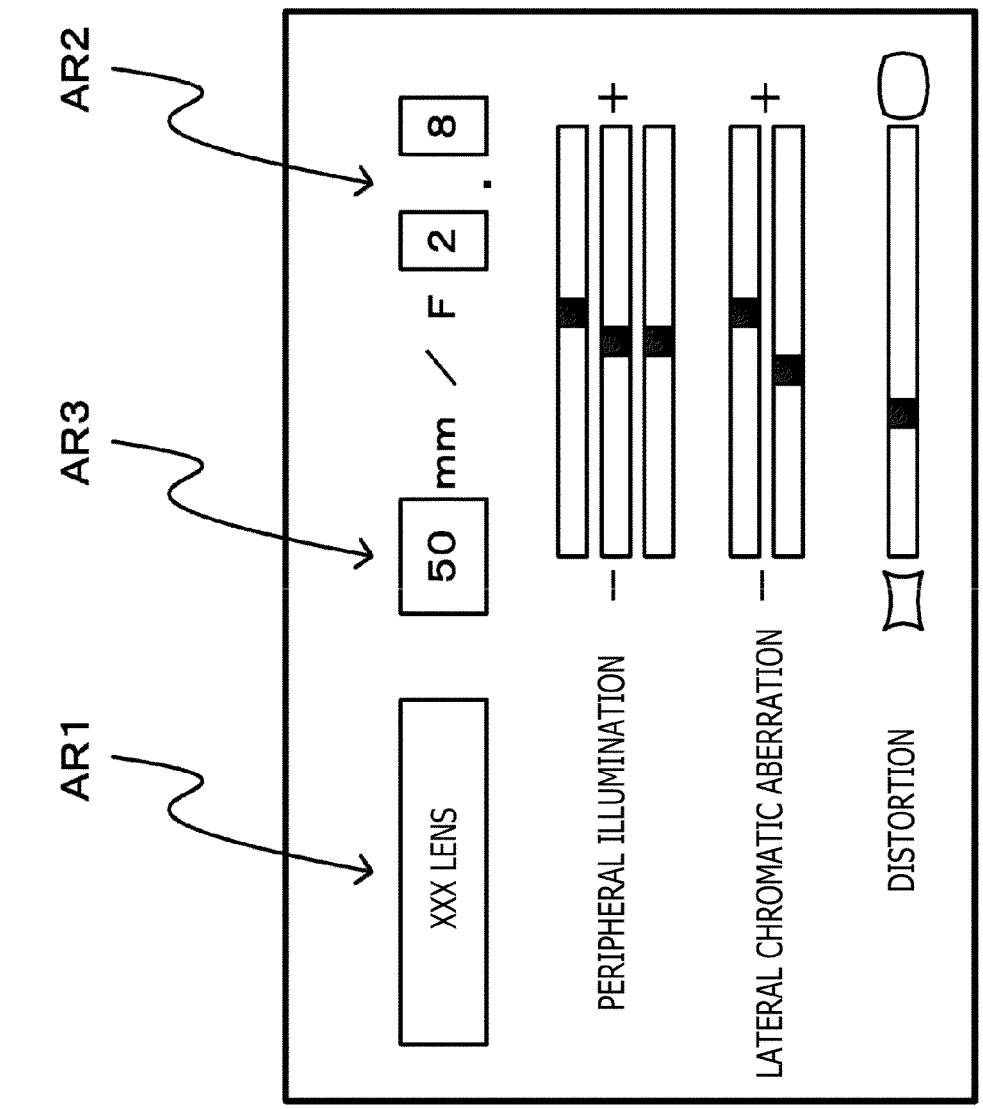
FIG. 10 is a diagram illustrating an example of a lens status input screen.

The control unit 50 allows user inputs by displaying a lens status input screen on the display unit 34 that displays an image captured through the interchangeable lens 21, for example. FIG. 10 is a diagram illustrating an example of the lens status input screen. On the lens status input screen, the user can input the name of the interchangeable lens in an input area AR1, and the F-stop of the interchangeable lens in an input area AR2, and the subject distance in an input area AR3, for example. It is noted that on the lens status input screen, the user may be able to input information regarding the peripheral illumination, the lateral chromatic aberration, distortion, and the like, in addition to the name, the subject distance, and the F-stop of the interchangeable lens. Further, the imaging device 30 may be configured to communicate with a mobile terminal such as a smartphone and allow the user to input the lens status via the mobile terminal. In this case, an input screen similar to the input screen of the display unit 34 may be displayed on the mobile terminal. This makes data input operations consistent, facilitating the settings of the lens status.

Figure 11:
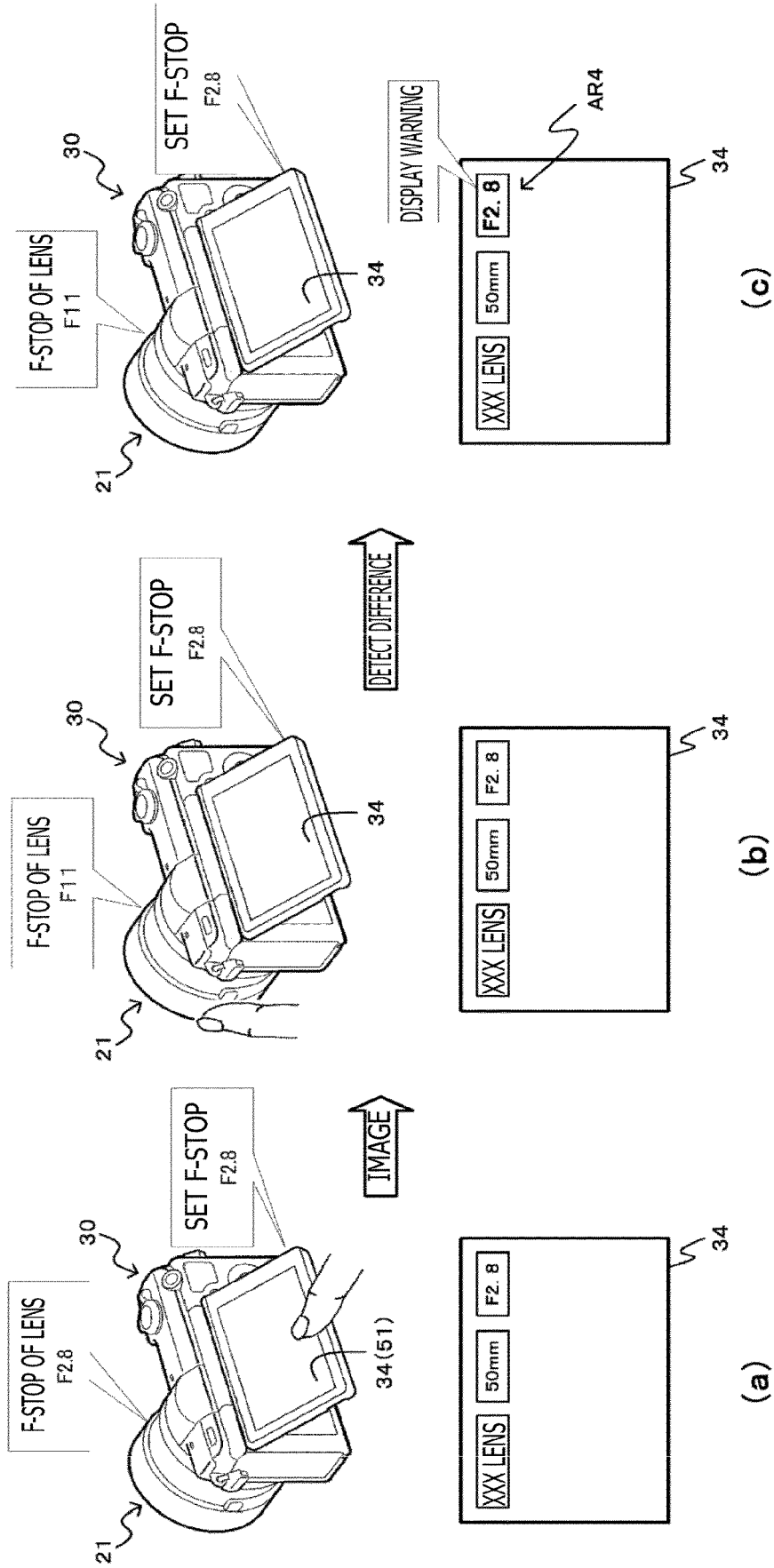
FIG. 11 is a diagram illustrating an example of warning operation.

Further, the control unit 50 displays a warning on the display unit 34 that displays an image captured through the interchangeable lens 21, for example. The warning displayed on the display unit 34 is an identification display that can make a difference between the interchangeable lens status and the user setting lens status identifiable. FIG. 11 illustrates an example of a warning operation. It is noted that FIG. 11 illustrates an operation of issuing a warning about an F-stop. FIG. 11(a) illustrates an example of the operation at previous imaging. For example, a touch panel is provided on the screen of the display unit 34. The touch panel constitutes the user interface unit 41. The user inputs the F-stop of the interchangeable lens, for example, "F2.8" by operating the touch panel provided on the screen of the display unit 34. Further, the user sets the F-stop of the lens to "F2.8" by operating the interchangeable lens 21, and then performs imaging. In this case, there is no difference between the interchangeable lens status (the F-stop of the interchangeable lens) and the user setting lens status (the F-stop input by the user).

Next, as illustrated in FIG. 11(b), in a case where the user changes the F-stop of the lens to "F11" by operating the lens but the F-stop in the user setting lens status has not been updated, the control unit 50 performs the processes in steps ST1 to ST3 in FIG. 3 and a warning indicating the difference in the lens status is displayed on the screen of the display unit 34. For example, as illustrated in FIG. 11(c), the display "F2.8" indicating the set F-stop is highlighted as a warning. It is noted that although FIG. 11(c) illustrates an example where the F-stop is highlighted as a warning, the warning is not limited to highlighting. Any warning display is possible as long as the warning is displayed in an identifiable manner for the user. For example, the item that has a difference may be blinked, displayed inversely, displayed in specific color, or enlarged on the display. A warning may be a combination thereof. Further, the control unit 50 may issue a warning by voice.

Figure 12:
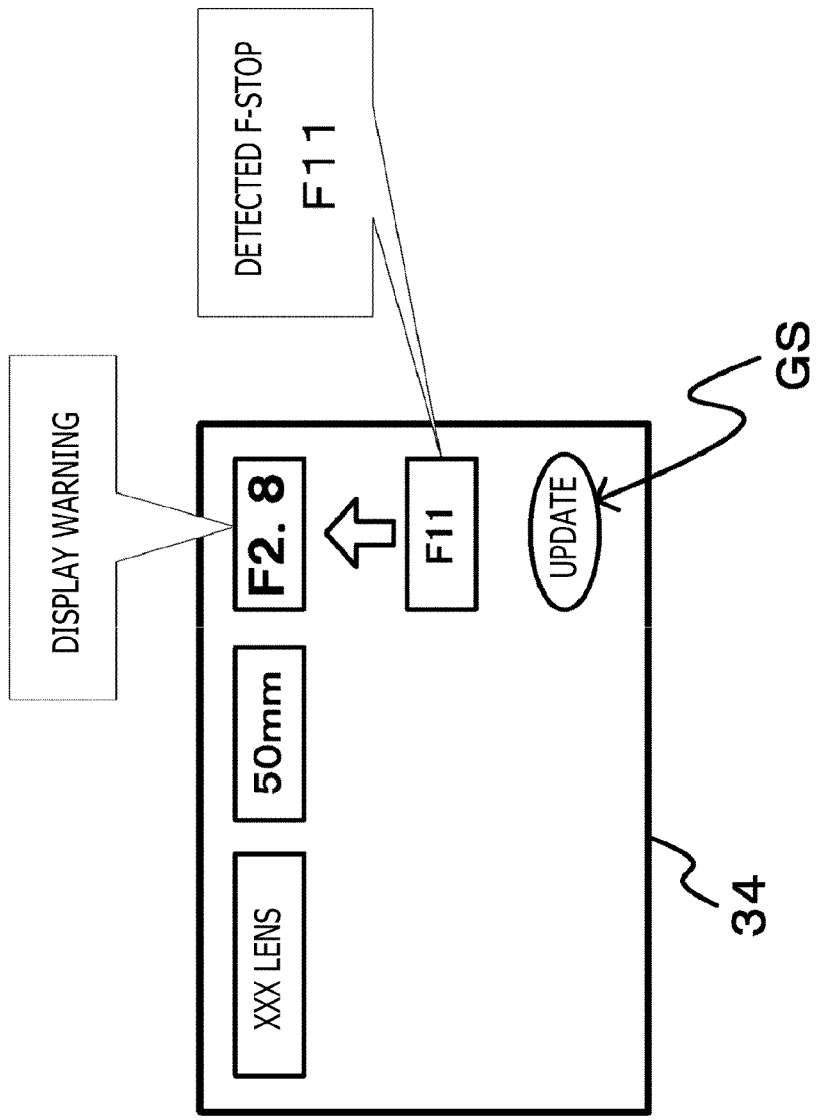
FIG. 12 is a diagram illustrating another example of the warning operation.

Further, the control unit 50 may display the lens status together with the warning. In this case, the control unit 50 can receive an operation for changing the lens status being displayed and update the set lens status accordingly. For example, a display area AR4 illustrated in FIG. 11(c) displays the set F-stop. On the display area AR4, a new F-stop can be input and the user setting lens status can be updated accordingly. In addition, the control unit 50 may display the lens status estimated by the status change estimating unit and update the user setting lens status to the lens status selected by an operation of selecting the lens status estimated by the status change estimating unit. FIG. 12 illustrates another example of the warning operation. For example, as illustrated in FIG. 12, the F-stop (estimated F-stop) "F11" of the interchangeable lens status that has a difference is displayed. When the user operates an update mark GS, the F-stop of the user setting lens status is updated from "F2.8" to "F11," which is the F-stop of the interchangeable lens status. Performing such a process in the control unit can facilitate the update of the user setting lens status.

Further, the series of the processes described in the specification can be executed by hardware, software, or in a combination thereof. In a case where the processes are to be executed by software, the program recording a process sequence is installed in a memory of a computer incorporated into dedicated hardware and executed. Alternatively, the program can be installed and executed in a general-purpose computer capable of executing various kinds of processes.

For example, the program can be recorded in advance in a hard disk, an SSD (Solid State Drive), or a ROM (Read Only Memory) as a recording medium. Alternatively, the program can be temporarily or permanently stored (recorded) in a removable recording medium such as a flexible disk, a CD-ROM (Compact Disc Read Only Memory), an MO (Magneto Optical) disk, a DVD (Digital Versatile Disc), a BD (Blu-Ray Disc (registered trademark)), a magnetic disk, and a semiconductor memory card. Such a removable recording medium can be provided as, what is called, a package software.

Further, the program may be installed from the removable recording medium into the computer, or may be wirelessly or wiredly transferred from a download site to the computer via a network such as a LAN (Local Area Network) and the Internet. The computer can receive the program transferred in this manner and install the program into a recording medium such as a built-in hard disk.

It is noted that the effects described in the present specification are merely examples and are not limited to those examples. Additional effects that are not described may be exhibited. Further, the present technology should not be construed as limited to the embodiments of the above-described technology. The embodiments of the present technology disclose the present technology in the form of exemplification, and it is obvious that those skilled in the art can make modifications or substitutions of the embodiments without departing from the gist of the present technology. That is, the claims should be taken into consideration to determine the gist of the present technology.

Further, the imaging device of the present technology can be configured as follows.

(1)

An imaging device including:

a control unit configured to perform an interchangeable lens status change estimation to indicate a change in status of an interchangeable lens, and configured to output warning information to a warning unit to warn a user in a case where interchangeable lens status is determined to be different from user setting lens status on a basis of a result of the interchangeable lens status change estimation.

(2)

The imaging device according to (1), in which in a case where the result of the interchangeable lens status change estimation indicates that the interchangeable lens status has been changed, the control unit determines that the interchangeable lens status is different from the user setting lens status.

(3)

The imaging device according to (1), in which the control unit detects a change in the user setting lens status, and in a case where any one of the interchangeable lens status and the user setting lens status has been changed, the control unit determines that the interchangeable lens status is different from the user setting lens status.

(4)

The imaging device according to (1), in which the control unit detects a change in the user setting lens status, and in a case where the control unit determines that a change direction of the user setting lens status and a change direction of the interchangeable lens status are different from each other, the control unit determines that the interchangeable lens status is different from the user setting lens status.

(5)

The imaging device according to (1), in which the control unit determines whether the interchangeable lens status is different from the user setting lens status on a basis of an estimated value of the interchangeable lens status calculated by the interchangeable lens status change estimation and a setting value of the user setting lens status.

(6)

The imaging device according to any one of (1) to (5), in which as the interchangeable lens status change estimation, the control unit estimates a change in the interchangeable lens status caused by a user operation on the interchangeable lens.

(7)

The imaging device according to (6), in which the user operation on the interchangeable lens is an operation of adjusting the interchangeable lens.

(8)

The imaging device according to (6), in which the user operation on the interchangeable lens is an operation of replacing the interchangeable lens.

(9)

The imaging device according to any one of (1) to (8), in which as the interchangeable lens status change estimation, the control unit estimates a change in the interchangeable lens status caused by a user operation on the imaging device.

(10)

The imaging device according to (9), in which the user operation is an operation related to an image stabilization function.

(11)

The imaging device according to (9), in which the user operation is an operation related to lens information regarding the interchangeable lens.

(12)

The imaging device according to (9), in which the user operation is an operation related to a power supply.

(13)

The imaging device according to any one of (1) to (12), further including:

a display unit, in which the control unit causes the display unit to perform an identification display on a basis of the warning information, so as to make a difference between the interchangeable lens status and the user setting lens status identifiable.

(14)

The imaging device according to (13), in which the control unit causes the display unit to display the user setting lens status currently set together with the identification display, and updates the interchangeable lens status according to a user operation of changing the user setting lens status being displayed.

(15)

The imaging device according to (13), in which the control unit causes the display unit to display the interchangeable lens status in addition to the user setting lens status, and updates the interchangeable lens status according to a user operation of selecting the interchangeable lens status.

(16)

The imaging device according to any one of (1) to (15), in which the control unit associates attached information with image information of a captured image, the attached information indicating the interchangeable lens status or the user setting lens status.

INDUSTRIAL APPLICABILITY

The imaging device, the control method, and the program according to the present technology performs interchangeable lens status change estimation to indicate a change in status of an interchangeable lens. In a case where interchangeable lens status is determined to be different from user setting lens status on the basis of a result of the interchangeable lens status change estimation, warning information is output to the warning unit to warn a user. This configuration enables the user to recognize a difference between the user setting lens status and the interchangeable lens status. Therefore, the present technology is suitable for imaging devices in which a lens can be replaced and the user setting lens status can be input.

REFERENCE SIGNS LIST

10 . . . Imaging system
21 . . . Interchangeable lens
30 . . . Imaging device
31 . . . Mount unit
32 . . . Imaging unit
33 . . . Image signal processing unit
34 . . . Display unit
35 . . . Recording medium
36 . . . Sensor unit
41 . . . User interface (I/F) unit
42 . . . Warning unit
43 . . . Communication unit
44 . . . Lens communication unit
50 . . . Control unit
501 . . . Status change estimating unit
502 . . . Warning control unit

The invention claimed is:

1. An imaging device comprising:
controller configured to
   perform an interchangeable lens status change estimation to indicate a change in a status of an interchangeable lens, the interchangeable lens status change estimation is performed without receiving lens information from the interchangeable lens,
   determine whether an interchangeable lens status is different from a user setting lens status in response to the interchangeable lens status change estimation indicating the change in the status of the interchangeable lens, and
   control warning circuitry to output warning information that warns a user in response to determining that the interchangeable lens status is different from the user setting lens status.

2. The imaging device according to claim 1,
wherein, to determine whether the interchangeable lens status is different from the user setting lens status in response to the interchangeable lens status change estimation indicating the change in the status of the interchangeable lens, the controller is configured to determine that the interchangeable lens status is different from the user setting lens status in response to the interchangeable lens status change estimation indicating the change in the status of the interchangeable lens.

3. The imaging device according to claim 1,
wherein the controller is further configured to
   detect a change in the user setting lens status from a first user setting lens status to a second user setting lens status, the three or more user setting lenses statuses including the first user setting lens status and the second user setting lens status, and
   determine that the interchangeable lens status is different from the second user setting lens status in response to at least one of the interchangeable lens status change estimation indicating the change in the status of the interchangeable lens or the detection of the change in the user setting lens status.

4. The imaging device according to claim 1,
wherein the controller is further configured to
   detect a change in the user setting lens status from a first user setting lens status to a second user setting lens status, the three or more user setting lenses statuses including the first user setting lens status and the second user setting lens status, determine that a change direction of the second user setting lens status and a change direction of the interchangeable lens status are different from each other, and
   determine that the interchangeable lens status is different from the second user setting lens status in response to determining that the change direction of the second user setting lens status and the change direction of the interchangeable lens status are different from each other.

5. The imaging device according to claim 1,
wherein, to perform the interchangeable lens status change estimation to indicate the change in the status of the interchangeable lens, the controller is configured to generate an estimated value of the interchangeable lens status, and the controller is further configured to determine whether the interchangeable lens status is different from the user setting lens status on a basis of the estimated value and a setting value of the user setting lens status.

6. The imaging device according to claim 1, wherein, to perform the interchangeable lens status change estimation to indicate the change in the status of the interchangeable lens, the controller is configured to estimate the change in the interchangeable lens status caused by a user operation on the interchangeable lens.

7. The imaging device according to claim 6,
wherein the user operation on the interchangeable lens is an operation of adjusting the interchangeable lens.

8. The imaging device according to claim 6,
wherein the user operation on the interchangeable lens is an operation of replacing the interchangeable lens.

9. The imaging device according to claim 1,
wherein, to perform the interchangeable lens status change estimation to indicate the change in the status of the interchangeable lens, the controller is configured to estimate a change in the interchangeable lens status caused by a user operation on the imaging device.

10. The imaging device according to claim 9,
wherein the user operation is an operation related to an image stabilization function.

11. The imaging device according to claim 9,
wherein the user operation is an operation related to lens information regarding the interchangeable lens.

12. The imaging device according to claim 9,
wherein the user operation is an operation related to a power supply.

13. The imaging device according to claim 1, further comprising:
a display,
wherein the controller is further configured to control the display to display an identification display on a basis of the warning information, the identification display illustrating a difference between the interchangeable lens status and the user setting lens status.

14. The imaging device according to claim 13,
wherein the controller is further configured to
   control the display to display the user setting lens status that is currently set together with the identification display, and
   update the interchangeable lens status according to a user operation of changing the user setting lens status being displayed.

15. The imaging device according to claim 13,
wherein the controller is further configured to
   control the display to display the interchangeable lens status in addition to the user setting lens status, and update the interchangeable lens status according to a user operation of selecting the interchangeable lens status.

16. The imaging device according to claim 1, wherein the controller is further configured to associate attached information with image information of a captured image, the attached information indicating the interchangeable lens status at the time the captured image was captured or the user setting lens status at the time the captured image was captured.

17. The imaging device according to claim 1, wherein the controller is further configured to perform the interchangeable lens status change estimation to indicate the change in the status of the interchangeable lens based on preset determination conditions.

18. The imaging device according to claim 1, wherein the user setting lens status is one of three or more user setting lens statuses that are different from each other.

19. A method for controlling an imaging device, the method comprising:
performing, with a controller, an interchangeable lens status change estimation to indicate a change in status of an interchangeable lens, the interchangeable lens status change estimation is performed without receiving lens information from the interchangeable lens;
determining, with the controller, whether an interchangeable lens status is different from a user setting lens status on a basis of the interchangeable lens status change estimation; and
controlling, with the controller, a warning circuitry to output warning information that warns a user in response to determining that the interchangeable lens status is different from the user setting lens status on of the basis of the interchangeable lens status change estimation.

20. The method according to claim 19, wherein determining whether the interchangeable lens status is different from the user setting lens status in response to the interchangeable lens status change estimation indicating the change in the status of the interchangeable lens further includes determining that the interchangeable lens status is different from the user setting lens status in response to the interchangeable lens status change estimation indicating the change in the status of the interchangeable lens.

21. The method according to claim 19, wherein the user setting lens status is one of three or more user setting lens statuses that are different from each other.

22. A non-transitory computer-readable medium comprising a program that, when executed by an electronic processor, causes the electronic processor to perform a set of operations comprising:
performing an interchangeable lens status change estimation to indicate a change in status of an interchangeable lens, the interchangeable lens status change estimation is performed without receiving lens information from the interchangeable lens;
determining whether an interchangeable lens status is different from a user setting lens status on a basis of the interchangeable lens status change estimation; and
controlling warning circuitry to output warning information that warns a user in response to determining that the interchangeable lens status is different from the user setting lens status on of the basis of the interchangeable lens status change estimation.

23. The non-transitory computer-readable medium according to claim 22, wherein determining whether the interchangeable lens status is different from the user setting lens status in response to the interchangeable lens status change estimation indicating the change in the status of the interchangeable lens further includes determining that the interchangeable lens status is different from the user setting lens status in response to the interchangeable lens status change estimation indicating the change in the status of the interchangeable lens.

24. The non-transitory computer-readable medium according to claim 22, wherein the user setting lens status is one of three or more user setting lens statuses that are different from each other.

\* \* \* \* \*